United States Patent
Morsali et al.

(10) Patent No.: US 10,790,889 B2
(45) Date of Patent: Sep. 29, 2020

(54) EFFICIENT IMPLEMENTATION OF HYBRID BEAMFORMING

(71) Applicant: IDAC Holdings, Inc., Wilmington, DE (US)

(72) Inventors: Alireza Morsali, Montreal (CA); Benoit J. F. Champagne, Westmount (CA); Afshin Haghighat, Ile-Bizard (CA)

(73) Assignee: IDAC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/477,004

(22) PCT Filed: Jan. 18, 2018

(86) PCT No.: PCT/US2018/014137
§ 371 (c)(1),
(2) Date: Jul. 10, 2019

(87) PCT Pub. No.: WO2018/136581
PCT Pub. Date: Jul. 26, 2018

(65) Prior Publication Data
US 2019/0356370 A1 Nov. 21, 2019

Related U.S. Application Data

(60) Provisional application No. 62/448,346, filed on Jan. 19, 2017.

(51) Int. Cl.
*H04B 7/06* (2006.01)

(52) U.S. Cl.
CPC .................. *H04B 7/0617* (2013.01)

(58) Field of Classification Search
None
See application file for complete search history.

(56) References Cited

U.S. PATENT DOCUMENTS 9,762,302 B1 * 9/2017 Shaked ............... H04B 7/0456
9,967,014 B1 * 5/2018 Park .................... H04B 7/0617
(Continued)

OTHER PUBLICATIONS

International Preliminary Report on Patentability for PCT/US2018/014137 dated Jul. 23, 2019, 6 pages.
(Continued)

*Primary Examiner* — Lana N Le
(74) *Attorney, Agent, or Firm* — Invention Mine LLC

(57) ABSTRACT

Hybrid beamforming may be configured for wireless communication systems (e.g., multiple-input multiple output (MIMO) and/or massive-MIMO). The implementation(s) may determine a number of radio frequency (RF) chains for realizing a fully digital precoder (FDP) in a structure (e.g., a hybrid analog/digital precoder). The number of RF chains may be less than a number of transmitter antennas. A transmit vector signal may be determined based on a digital precoder and an input symbol vector. An analog precoder and/or a baseband signal may be determined based on the determined transmit vector signal. The number of RF chains may be determined based on the determined baseband signal. The baseband signal may be fed to the determined number of RF chains. The analog precoder may determine a beamforming signal based on an output of the determined number of RF chains. The analog precoder may transmit the beamforming signal using the number of transmitter antennas.

20 Claims, 22 Drawing Sheets

(56) References Cited

U.S. PATENT DOCUMENTS

| | | | | |
|---|---|---|---|---|
| 10,020,596 B2* | 7/2018 | Benjebbour | ......... | H04B 7/0617 |
| 10,461,836 B2* | 10/2019 | Petersson | ................ | H03F 3/602 |
| 2019/0373485 A1* | 12/2019 | Kato | ..................... | H04W 24/02 |

OTHER PUBLICATIONS

International Search Report and Written Opinion of the International Searching Authority for PCT/US2018/014137 dated May 22, 2018.
Sohrabi F., et. al., "Hybrid Digital and Analog Beamforming Design for Large-Scale Antenna Arrays". Available at: https://arxiv.org/pdf/1601.06814, Jan. 25, 2016, pp. 1-13.
Larsson, E., et. al., "Massive MIMO for Next Generation Wireless Systems". Available at: https://arxiv.org/pdf/1304.6690, Jan. 21, 2014, pp. 1-20.
Goldsmith, A., et. al., "Capacity Limits of MIMO Channels". IEEE Journal on Selected Areas in Communications, vol. 21, No. 5, Jun. 2003, pp. 684-702.
Palomar, D., et. al., "Joint Tx-Rx Beamforming Design for Multicarrier MIMO Channels: A Unified Framework for Convex Optimization". IEEE Transactions on Signal Processing, vol. 51, No. 9, Sep. 2003, pp. 2381-2401.
Ayach, O., et. al., "Spatially Sparse Precoding in Millimeter Wave MIMO Systems". Available at: https://arxiv.org/pdf/1305.2460, May 11, 2013, pp. 1-30.
Zhang, X., et. al., "Variable-Phase-Shift-Based Rf-Baseband Codesign for MIMO Antenna Selection". IEEE Transactions on Signal Processing, vol. 53, No. 11, Nov. 2005, pp. 4091-4103.
Bogale, T., et. al., "On the Number of RF Chains and Phase Shifters, And Scheduling Design with Hybrid Analog/Digital Beamforming". Available at: https://arxiv.org/pdf/1410.2609, Jul. 24, 2016, pp. 1-37.
Li, J., et. al., "Robust and Low Complexity Hybrid Beamforming for Uplink Multiuser mmWave MIMO Systems". IEEE Communications Letters, vol. 20, No. 6, Jun. 2016, pp. 1140-1143.
Third Generation Partnership Project, "WF on Supported NR Operations". Samsung, Nokia, ALU Shanghai Bell, 3GPP TSG RAN WG1 #85, R1-165559, Agenda item 7.1.6, May 23-27, 2016, 3 pages.

* cited by examiner

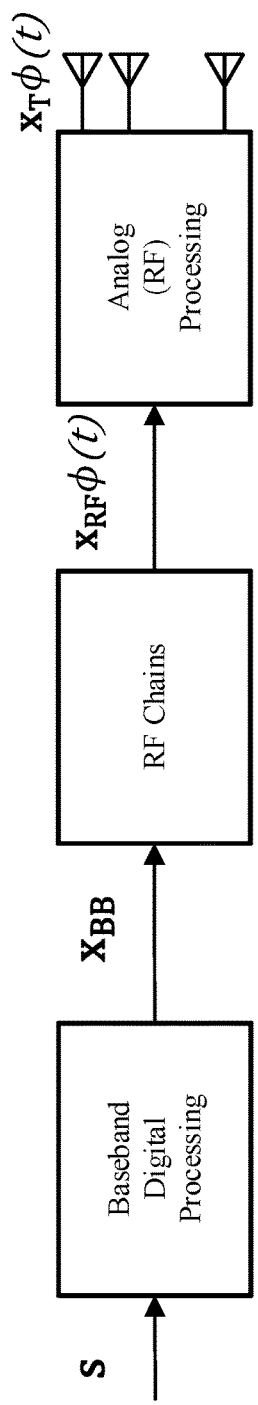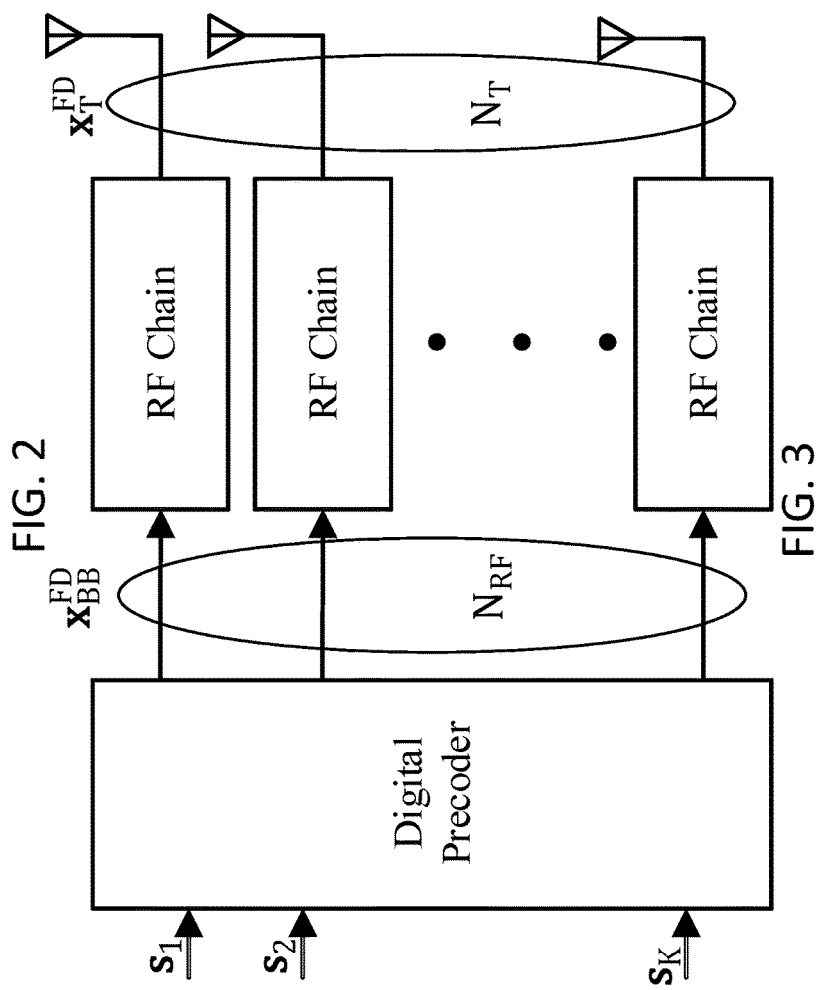
FIG. 2
FIG. 3

US 10,790,889 B2

EFFICIENT IMPLEMENTATION OF HYBRID BEAMFORMING

CROSS-REFERENCE TO RELATED APPLICATIONS

This application is a national stage application under 35 U.S.C. 371 of International Application No. PCT/US2018/014137, entitled "Efficient Implementation of Hybrid Beamforming," filed on Jan. 18, 2018, which claims benefit under 35 U.S.C. § 119(e) from the benefit of U.S. Provisional Ser. No. 62/448,346, entitled "Efficient Implementation of Hybrid Beamforming," filed Jan. 19, 2017, the contents of which are incorporated by reference herein.

BACKGROUND

Wireless communication systems continue to evolve. A new fifth generation may be referred to as 5G. An example of a previous generation of mobile communication system may be referred to as fourth (4G) long term evolution (LTE).

SUMMARY

Systems, methods, and instrumentalities for implementation(s) associated with hybrid beamforming are disclosed, e.g., for wireless communication systems. The implementation(s) may determine a number of radio frequency (RF) chains for realizing a fully digital precoder (FDP) in a hybrid structure. For example, the hybrid structure may include a hybrid analog/digital precoder (NADP). The implementation(s) may be used for multiple-input multiple-output (MIMO) and/or massive-MIMO.

A determined number of RF chains in the implementation(s) described herein may be less (e.g., much less) than a number of transmitter antennas (e.g., a minimum number of RF chains may be determined for realizing a fully digital precoder (FDP) in a hybrid structure). In examples, the determined number of RF chains may have two RF chains. In examples, the determined number of RF chains may be set to one RF chain.

An example of the implementation may include one or more of the following. A device may receive, generate, etc. data to be transmitted. The device may include, but is not limited to, network-side devices, and end-user devices, e.g., as disclosed herein. The data may include an input symbol vector. The symbol vector may be precoded and transmitted via the device.

A transmit vector signal may be determined (e.g., calculated). The transmit vector signal may be referred to as a desired transmit signal. The transmit vector signal may be determined based on a digital precoder and the input symbol vector. Based on the estimated channel and/or suggested to the digital precoder (e.g., by a receiver side), the digital precoder may be calculated to be a reference design.

An analog precoder may be determined. For example, the analog precoder (e.g., a matrix associated with the analog precoder) may be constructed based on the determined transmit vector signal. For example, the analog precoder may be determined based on a maximum absolute value of the transmit vector signal.

A baseband signal may be determined. A baseband signal may be referred to as an input baseband signal. The baseband signal may be determined based on the determined transmit vector signal. For example, the baseband signal may be determined based on a maximum absolute value of the transmit vector signal.

In examples, the analog precoder and the baseband signal may be determined, e.g., simultaneously. In examples, the baseband signal may be determined and the analog precoder may be determined. In examples, the analog precoder may be determined and the baseband signal may be determined.

A number of RF chains may be determined. For example, the number of RF chains may be determined based on the determined baseband signal. The number of RF chains may be less (e.g., much less) than a number of transmitter antennas. In examples, the number of RF chains may be set to one RF chain. In examples, the number of RF chains may be set to two RF chains. The number of RF chains may depend on the determined baseband signal. In examples, if a determined baseband signal is a complex number, the number of RF chains may be configured to one RF chain. In examples, if determined baseband signal is a real number, the number of RF chains may be configured to two RF chains.

The determined baseband signal may be fed to the determined number of RF chains. The output of the RF chains may be fed to the analog precoder. A beamforming signal may be determined by the analog precoder. For example, the beamforming signal may be determined based on the determined analog precoder and an output of the determined number of RF chains. The analog precoder may transmit the determined beamforming signal using the number of transmitter antennas.

BRIEF DESCRIPTION OF THE DRAWINGS

FIG. 2 illustrates example transmitter modules.

FIG. 3 illustrates an example of a fully digital precoder architecture.

FIG. 10 illustrates an example of $S_M(x, \alpha)$ block. $S_M(x, \alpha)$ may represent a process after generating of the baseband signal to the RF at the antenna.

DETAILED DESCRIPTION

A detailed description of illustrative embodiments will now be described with reference to the various figures. Although this description provides a detailed example of possible implementations, it should be noted that the details are intended to be exemplary and in no way limit the scope of the application.

Figure 1A:
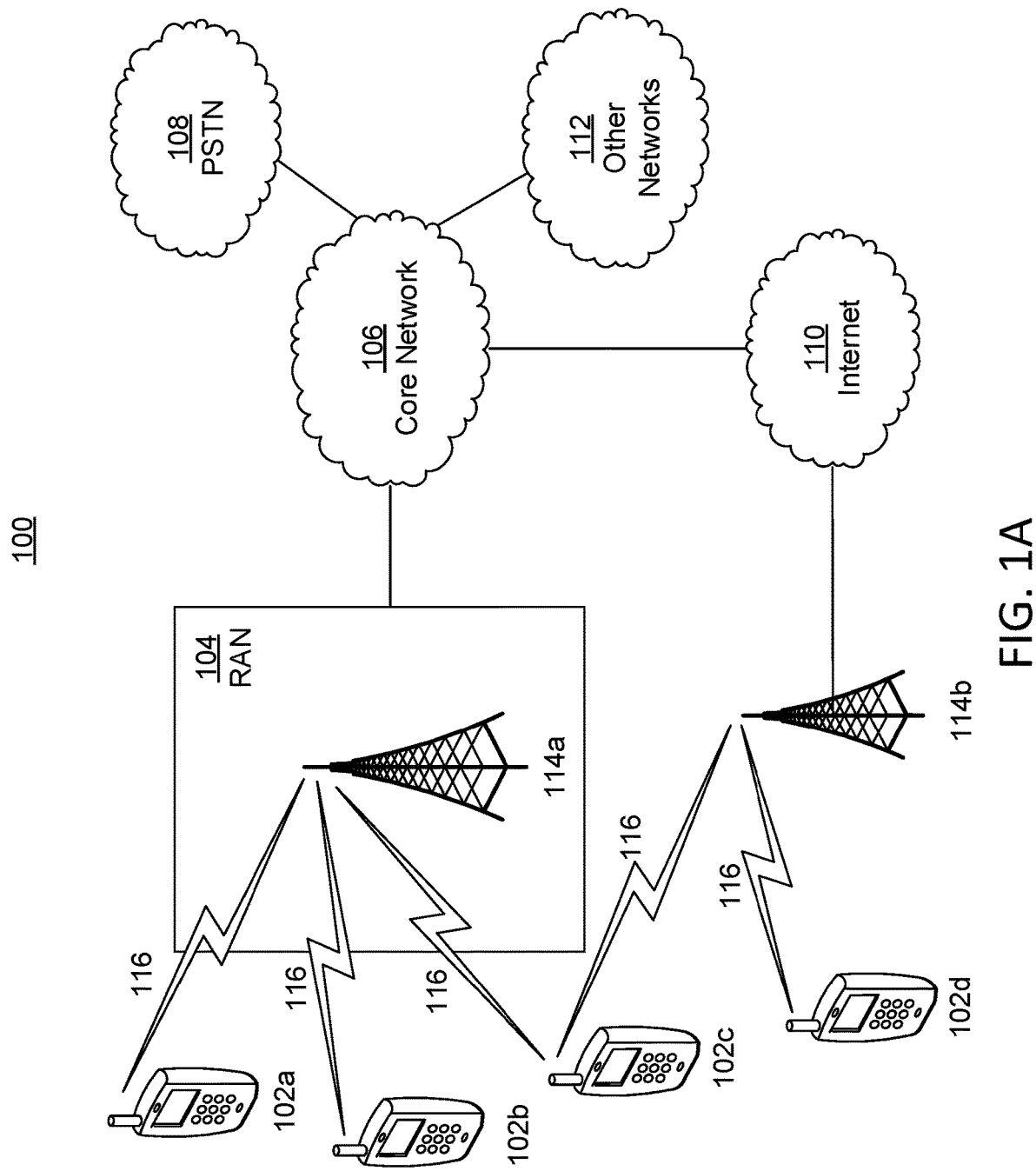
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
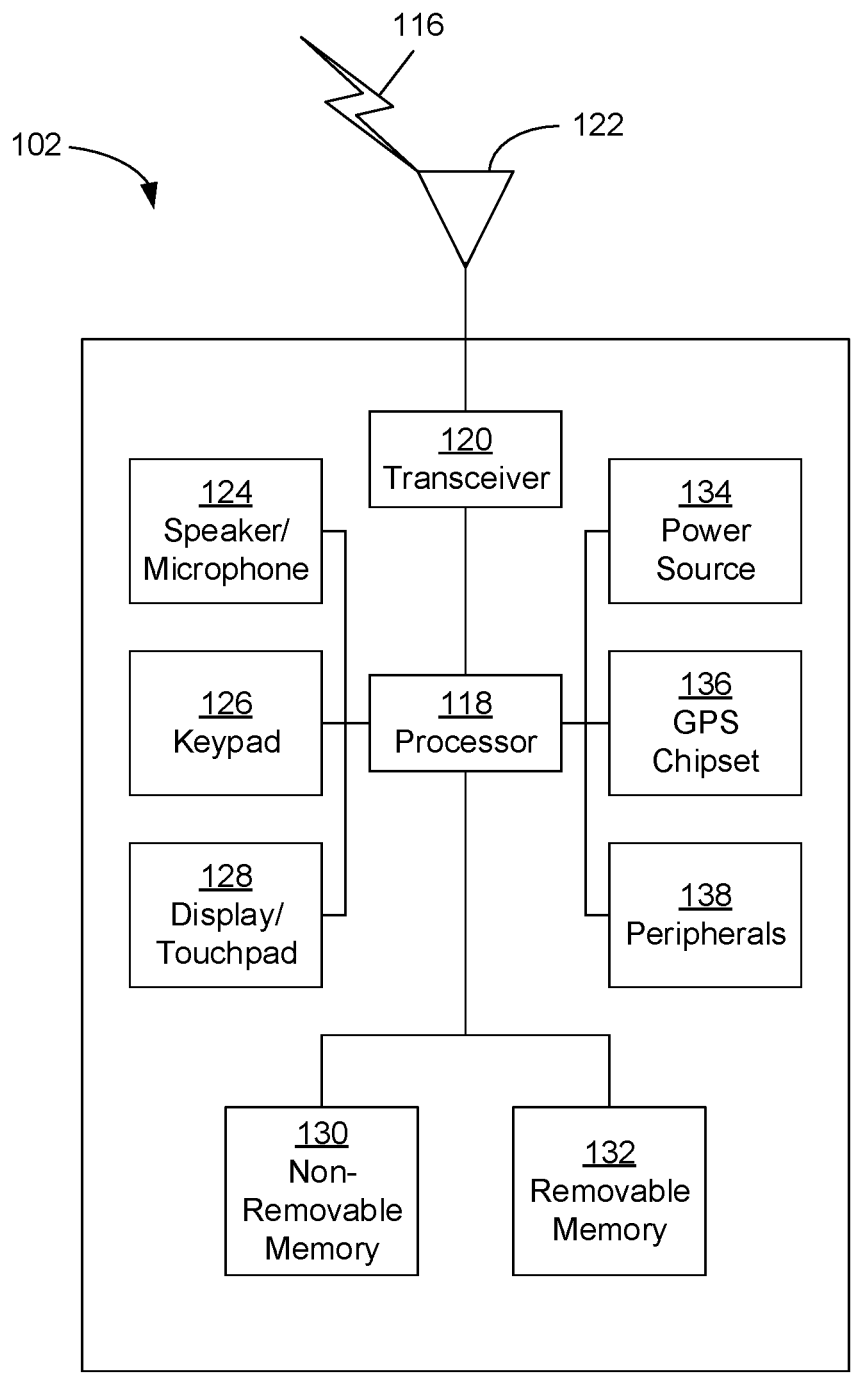
FIG. 1B is a system diagram illustrating an example wireless transmit/receive unit (WTRU) that may be used within the communications system illustrated in FIG. 1A according to an embodiment.
Figure 1C:
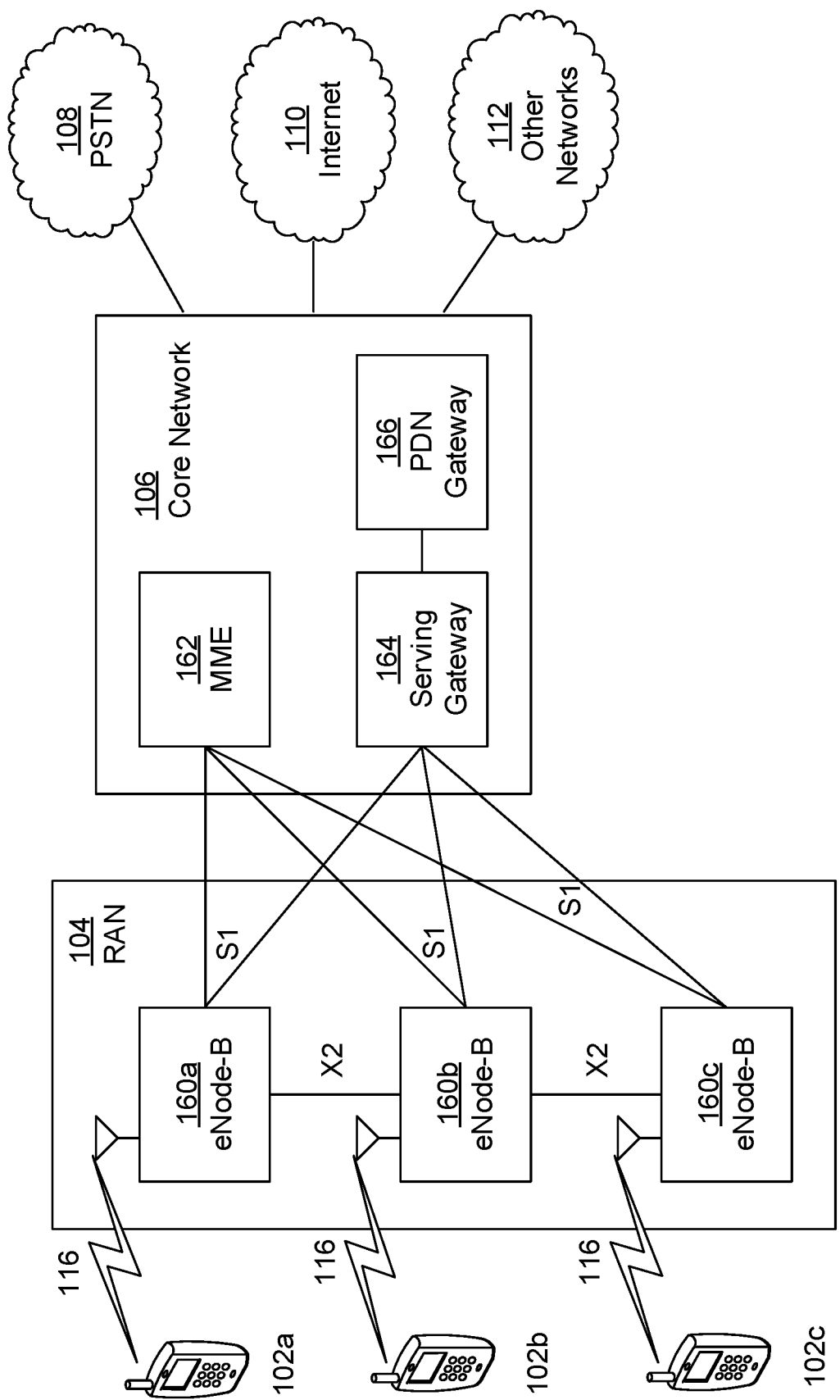
FIG. 1D is a system diagram illustrating a further example RAN and a further example CN that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 10:
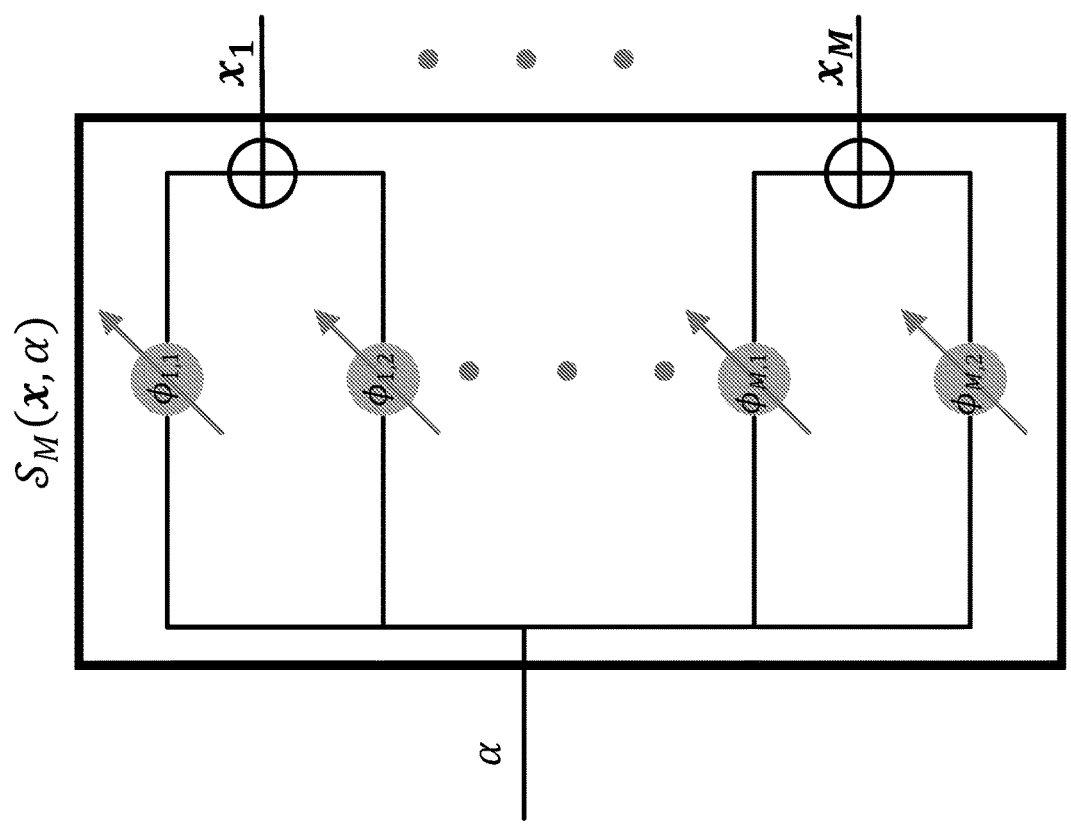
FIG. 10 is a system diagram illustrating an example radio access network (RAN) and an example core network (CN) that may be used within the communications system illustrated in FIG. 1A according to an embodiment.

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
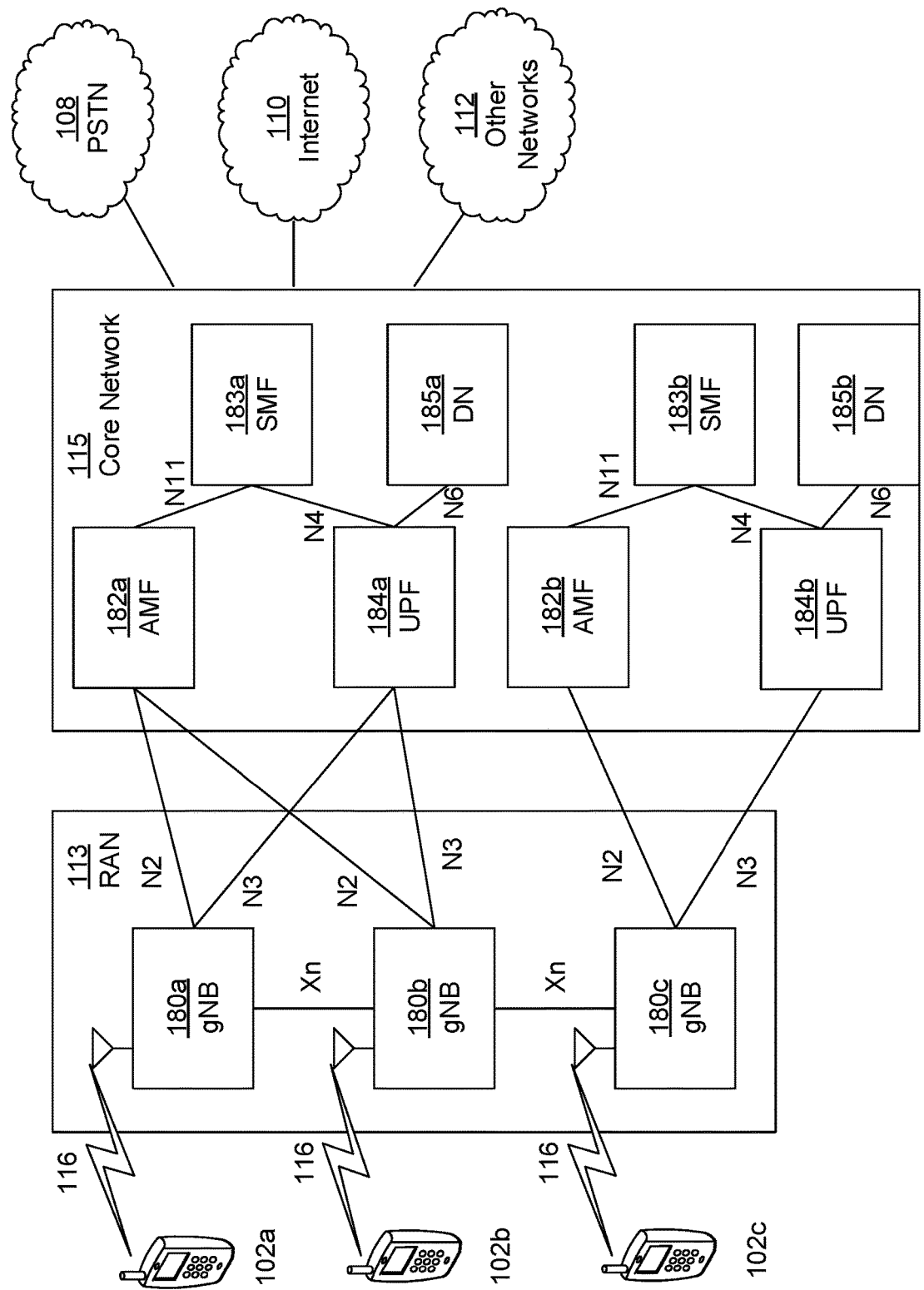

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a(not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b(and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Massive multiple-input multiple-output (massive-MIMO) and/or massive-MIMO empowered by millimeter wave technology (mmWave) may be emerging as a candidate for 5G and future wireless communication systems. Precoding (e.g., which may be a type of beamforming in this context) may be powerful and/or useful in MIMO systems. In massive-MIMO, precoding may play a role, for example, to prevent the path loss (e.g., severe path loss) affecting mmWave communications. Fully digital precoder (FDP) techniques may have one RF chain for each antenna element and may not be practical in massive-MIMO systems. For example, RF chains may include expensive and/or power consuming components. Dedicating one RF chain per antenna element may be prohibitive due to the large number of antennas characterizing massive-MIMO.

A hybrid analog/digital precoder (HADP) may be used to reduce the number of RF chains. For example, a HAPR may introduce a cascaded RF analog precoder after the baseband digital precoder to reduce the number of RF chains. Examples of one or more FDPs with the HADP structure may include two RF chains for a single data stream (e.g., one symbol per transmission). Multi-stream hybrid design(s) may be presented where the number of RF chains may be set equal to the number of symbols per transmission. The entries of the RF precoder in the HADP structure may be constrained to have unit magnitude (e.g., phase-shifters).

For a given FDP (e.g., one or more FDP(s)) with the HADP architecture, one or more implementations herein may minimize the number of RF chains (e.g., required number of RF chains). For example, a baseband digital precoder (e.g., in a HADP system model) may be taken from an abstract transformation space M. The HADP design may be formulated to minimize the number of RF chains that may be subject to an equality constraint on the multi-stream outputs, for example, of the FDP and HADP. The space M may be utilized to achieve a low number of RF chains. The one or more implementations of the HADP design described herein may not need extra hardware and/or computational complexity.

A general massive-MIMO transmitter with $N_T$ antennas and $N_{RF}$ RF chains may be described herein. Within each transmission (e.g., time slot), one or more K user(s) may be served. d symbol(s) may be transmitted for a user (e.g., each user).

$s_i = [s_{i,1}, s_{i,2}, \ldots s_{i,D}]^T$ may be an input symbol vector (e.g., symbol vector) of the ith users. $s_{i,j}$ may be taken from a discrete constellation $\mathcal{A}$ (e.g., M-ary Quadrature Amplitude Modulation (M-QAM) and/or M-ary Phase Shift Keying (M-PSK)). The symbol vector may be defined as, for example, $s = [s_1^T, s_2^T, s_K^T]^T \in \mathcal{A}^{N_s}$. $N_s = DK$ may be precoded and transmitted (e.g., may be precoded and then transmitted).

FIG. 2 is a diagram of example transmitter modules. For example, vector s may be processed by a baseband digital precoder. The output vector from the baseband digital precoder may be denoted, for example, as $x_{BB} \in \mathbb{C}^{N_{RF}} \phi(t)$. $N_{RF}$ RF chains may convert the discrete (e.g., digital) baseband signal $x_{BB}$ into, for example, an analog RF signal $x_{XF} \phi(t)$. $\phi(t)$ may represent the pulse-shaping and RF carrier modulation over the given time slot. $x_{RF} \in \mathbb{C}^{N_{RF}}$ may be a vector, for example, of complex gains. $x_{RF} \in \mathbb{C}^{N_{RF}}$ may represent a sampled version of the analog signal. The output of the RF chains (e.g., $x_{RF}$) may be a continuous time high frequency signal.

$x_{RF}$ may be fed to the analog processing module (e.g., analog precoder) that may be a RF circuitry. The output signal $x_T$ may be transmitted via, for example, antenna array. One or more (e.g., all) of the signals and/or processing may be in radio frequency. The signal $x_T \in \mathbb{C}^{N_T}$ may represent, for example, the baseband sampled version of the transmitted continuous RF signal, e.g., similar to $x_{RF}$.

Precoder architectures may be described herein (e.g., a generalized precoder architecture). For example, the precoder architectures may include an FDP architecture, an HADP architecture, etc.

FIG. 3 illustrates example of a fully digital precoder architecture. In a FDP (e.g., FDP shown in FIG. 3), the number of RF chains may be limitless. The number of RF chains may equal the number of antennas (e.g., $N_{RF} = N_T$). The transmitted signal of an antenna (e.g., each antenna) element may be determined, for example, by the digital module. The antenna (e.g., each antenna) may have a dedicated RF chain (e.g., $x_T^{FD} = x_{RF}^{FD} = x_{BB}^{FD} \in \mathbb{C}^{N_T}$), e.g., RF processing may not be necessary as each antenna has a dedicated RF chain.

Precoding in multiple antenna systems may be realized, for example, as a linear transformation:

$$x_T^{FD} = P_{FD} s \qquad (1)$$

where, $P_{FD} \in \mathbb{C}^{N_T \times N_s}$ may be a fully digital precoder matrix.

Figure 4:
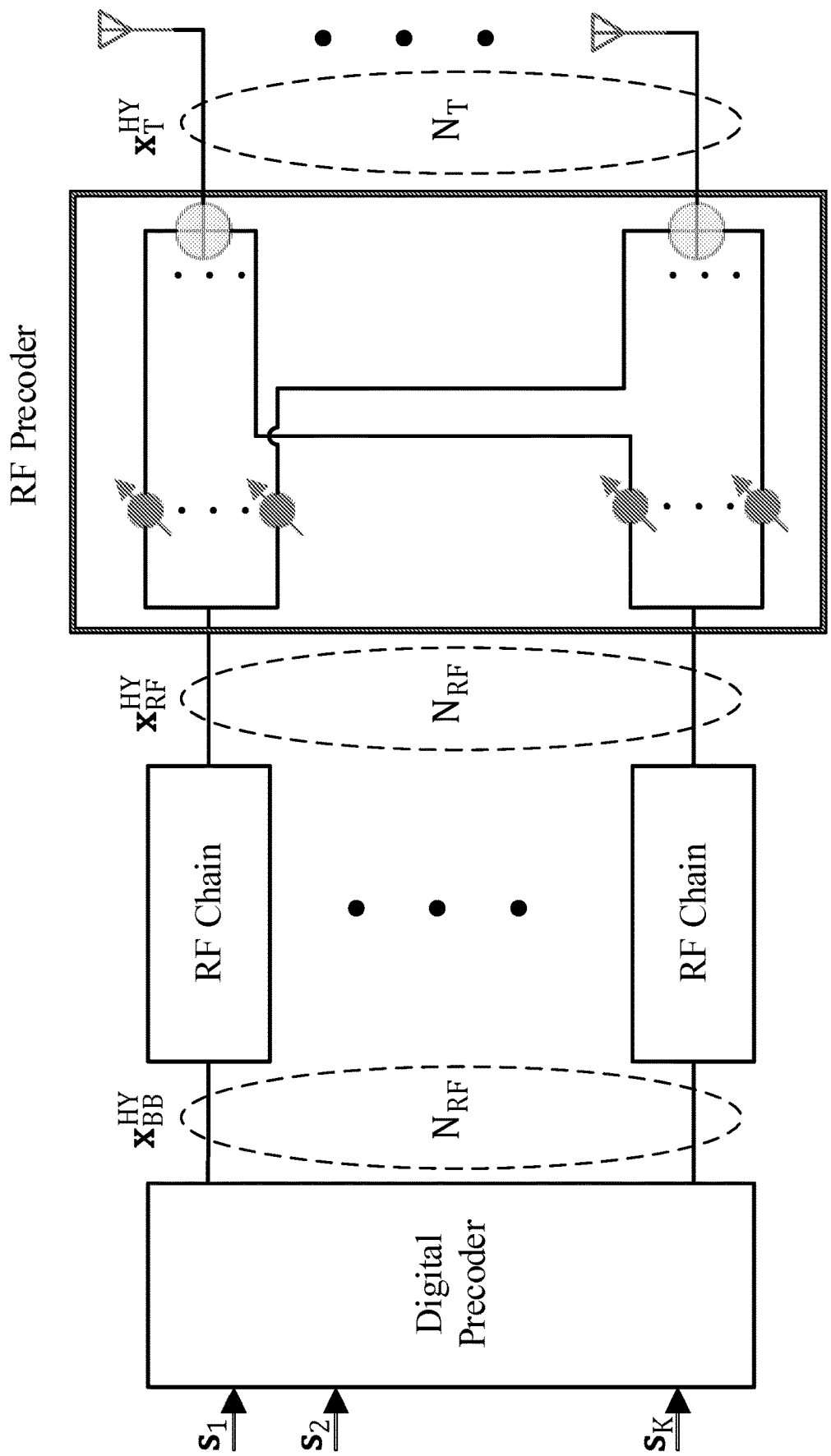
FIG. 4 illustrates an example of a massive-MIMO transmitter with HADP architecture.

FIG. 4 illustrates an example of a transmitter with HADP (e.g., for massive-MIMO). The HADP architecture may have a number of RF chain(s) that is less than a number of transmitter antennas (e.g., $N_{RF} < N_T$). For example, the number of RF chain may be much less than the number of transmitter antenna (e.g., $N_{RF} \ll N_T$). The digital precoder may not be confined to linear operation. For example, the output of the digital processing module may be provided (e.g., generalized) as:

$$x_{BB}^{HY} = \mathcal{F}_D\{s\} \in \mathbb{C}^{N_{RF}}. \quad (2)$$

$\mathcal{F}_D\{.\} \in \mathcal{M}$ may be a mapping from the given symbol vector s to desired output (e.g., $x_{BB}^{HY}$):

$$\mathcal{F}_D: \mathcal{A}^{N_s} \rightarrow \mathbb{C}^{N_{RF}} \quad (3)$$

Eq. 3 may be considered as the linear transformations:

$$\mathcal{F}_D\{s\} = P_D s, \quad (4)$$

where $P_D \in \mathbb{C}^{N_{RF} \times N_s}$ may be the digital precoder. Equation (4) may be an example case of Equation (2). In examples, $P_D$ and $P_{FD}$ matrices may play the same role. In examples, $P_{FD}$ may represent the $N_T \times N_S$ precoder for fully-digital precoder. In examples, $P_D$ may represent the $N_{RF} \times N_s$ digital precoder of the hybrid architecture.

Digital modules and analog modules (e.g., $x_{RF}^{HY} = x_{BB}^{HY} \in \mathbb{C}^{N_{RF}}$) may be connected. For example, digital modules and analog modules (e.g., $x_{RF}^{HY} = x_{BB}^{HY} \in \mathbb{C}^{N_{RF}}$) may be connected via $N_{RF}$ RF chains (e.g., as shown in FIG. 4). Analog precoding may be performed in RF domain, for example, via analog circuits. RF circuits may pose constraints (e.g., cost and/or power consumption constraints). The analog precoder for mmWave massive-MIMO communications may include phase shifters and/or adders (e.g., only phase shifters and/or adders). The matrix described herein may be an example analog RF precoder:

$$P_A \in \mathbb{U}^{N_T \times N_{RF}} \quad (5a)$$

$$\mathbb{U} = \{z \in \mathbb{C} : |z| = 1\} \quad (5b)$$

which may be an $N_{RF} \times N_T$ matrix with constant modulus entries. The output of the analog processing module may be:

$$X_T^{HY} = P_A x_{RF}^{HY} \quad (6)$$

Based on Equations (2) and/or (6), the output of the hybrid precoder may be written as:

$$x_T^{HY} = P_A \mathcal{F}_D\{s\}. \quad (7)$$

Based on Equations (4) and/or (7), the hybrid structure may be an example case of Equation (7), where $\mathcal{F}_D\{s\} = P_D s$ and may have the following form:

$$x_T^{HY} = P_A P_D s. \quad (8)$$

A hybrid precoder may be designed considering, for example, $P_A$ and $P_D$ in Equation (8). For a given vector s, for example, the effective precoder may determine the output of the precoder as:

$$X_T^{HY} = P_{eff} s = P_A P_D s. \quad (9)$$

One or more implementations described herein may determine a minimum number of RF chain(s) (e.g., the minimum number of required RF chains) for realizing a fully digital precoder, e.g., in a hybrid structure. The digital module, for example, based on Equation (2) may be utilized. For example, the given FDP $P_{FD}$ may be realized in HADP if:

$$P_A \mathcal{F}_D\{s\} = P_{FD} s. \quad (10)$$

Minimizing number of RF chains for realizing FDP in HADP may include (e.g., solving optimization problem):

$$\min_{P_A, \mathcal{F}_D\{.\}} N_{RF} \quad (11a)$$

and may be subject to $$P_A \mathcal{F}_D\{s\} = P_{FD} s \quad (11b)$$

$$P_A \in \mathbb{U}^{N_T \times N_{RF}} \quad (11c)$$

where, $$\mathbb{U} = \{z \in \mathbb{C} : |z| = 1\}. \quad (12)$$

Equation 12 may be a non-convex set. $\mathcal{F}_D\{.\} \in \mathcal{M}$ may be broad (e.g., too broad to be solved). $\mathcal{F}_D\{s\}$ may be bypassed (e.g., first bypassed) by an auxiliary signal (e.g., $x_{BB}^{HY}$) in Equation (2), and $x_{BB}^{HY}$ may be solved. $\mathcal{F}_D\{\}$ may be provided, for example, such that $\mathcal{F}_D\{s\} = x_{BB}^{HY}$.

$$\min_{P_A, x_{BB}^{FD}} N_{RF} \quad (13a)$$

may be subject to $$P_A x_{BB}^{HY} = P_{FD} s \quad (13b)$$

$$P_A \in \mathbb{U}^{N_T \times N_{RF}} \quad (13c)$$

which may mean minimizing $N_{RF}$ while finding RF precoder based on Equation (5) and vector $x_{BB}^{HY}(2)$ such that $P_A x_{BB}^{HY} = P_{FD} s$. Example 1 may solve for $x_{BB}^{HY}$ and $P_A$ that reduces (e.g., minimizes) the number of RF chains (e.g., required RF chains). One or more non-unique solutions for $P_A$ and $x_{BB}^{FD}$ may exist to minimize Equation (13) with an improved (e.g., optimum) objective function value (e.g., $N_{RF} = 2$) and may be referred to as Example 1.

Demonstration of Example 1 may be described herein. $N_{RF}$ may be a natural number, (e.g., $N_{RF} \in \{1, 2, 3, \ldots\}$), for example, to solve Equation (3). An approach may be taken starting from the least possible value for $N_{RF}$ and may show whether the constraints can be satisfied or not. The approach may move on to the next value for $N_{RF}$ until the constraints are satisfied.

For the case where $N_{RF} = 1$ from the Example 1, $P_{FD}$ and s may be given (e.g., provided). The left hand side of Equation (13b), e.g., $x_T^{FD} = P_{FD} s$ may be an arbitrary complex vector of size $N_T$. For $N_{RF} = 1$, $P_A$ may be a vector of size $N_T$ in $\mathbb{U}$ and $x_{BB}$ may be a complex scalar. $P_A$ may have one or more unit modulus entries. If $P_A$ has one or more unit modulus entries, $P_A x_{BB}^{HY}$ may be a vector of size $N_T$ where one or more (e.g., all) entries may have the same amplitude. $x_T^{FD}$ may be an arbitrary complex vector. If $x_T^{FD}$ is an arbitrary complex vector, $x_T^{FD} = P_A x_{BB}^{HY}$ may not be (e.g., may not be generally) held unless the one or more (e.g., all) entries of $x_T^{FD}$ have the same amplitude. $N_{RF} = 1$ may not be the minimum of Equation (13).

For the case where $N_{RF} = 2$ from the Example 1, $x_i$ may denote the ith entry of $x_T^{FD}$. $|x|_{max}$ and $|x|_{min}$ may be defined as the maximum and the minimum absolute values of $x_T^{FD}$, respectively. $P_A$ and $x_{BB}^{HY}$ for $N_{RF} = 2$ may be:

$$P_A = \begin{bmatrix} e^{j\phi_{1,1}} & e^{j\phi_{2,1}} & \ldots & e^{j\phi_{N_T,1}} \\ e^{j\phi_{1,2}} & e^{j\phi_{2,2}} & \ldots & e^{j\phi_{N_T,2}} \end{bmatrix}^T \quad (14a)$$

-continued $$x_{BB}^{HY} = [\alpha_1 \ \alpha_2]^T. \quad (14b)$$

From Example 2 (described herein), non-unique $\phi_{i,1}$ and $\phi_{i,2}$ may exist, for example, such that $x_i = \alpha_1 e^{\phi_{i,1}} + \alpha_2 e^{\phi_{i,1}}$ may have positive real numbers $\alpha_1$, $\alpha_2$:

$$|\alpha_1 - \alpha_2| < |x|_{min} \text{ and } |x|_{max} < |\alpha_1 + \alpha_2|.$$

For a given vectors and a fully digital precoder $P_{FD}$, a hybrid design (e.g., optimal hybrid design) with two RF chains (e.g., $N_{RF}=2$) may exist. For example, $P_A x_{BB}^{HY} = P_{FD}$ s may exist. For $N_{RF}=2$, solutions (e.g., optimal solutions) for $P_A$ and $x_{BB}^{HY}$ may exist.

For positive real numbers (e.g., $\beta_1$ and $\beta_2$), a complex number z where $|\beta_1 - \beta_2| < |z| < |\beta_1 + \beta_2|$ may be written as:

$$z = \beta_1 e^{\theta_1} + \beta_2 e^{\theta_2}$$

where $\theta_1, \theta_2 \in [0, 2\pi]$, and $\theta_1, \theta_2$ may be non-unique and may be referred to as Example 2.

From Example 2, the solutions (e.g., optimal solution) of Equation (13) may not be unique. One or more implementations for $P_A$ and $x_{BB}^{HY}$ may exist.

Exemplary implementation(s) may be described herein. For example, a given arbitrary complex vector $x_T^{FD}$ of size $N_T$ with polar representation of ith component as $x_i = |x_i| e^{j\theta_i}$ may be provided. $|x|_{max}$ may be defined as the maximum absolute values of $x_T^{FD}$. A set of solution may exist for $\alpha$ such that $$\alpha \geq \frac{|x|_{max}}{2}$$

and/or $\alpha_1 = \alpha_2 = \alpha$. Example 2 (e.g., a condition of Example 2) may be satisfied as $|\alpha - \alpha| < |x|_{min}$ and $|x|_{max} < |2\alpha|$. Equation (14) may be designed as:

$$x_{BB}^{HY} = [\alpha \ \alpha]^T \quad (16a)$$

$$\phi_{i,1} = \vartheta_i - \cos^{-1}\left(\frac{|x_i|}{2\alpha}\right) \quad (16b)$$

$$\phi_{i,2} = \vartheta_i + \cos^{-1}\left(\frac{|x_i|}{2\alpha}\right) \quad (16c)$$

$$\alpha = \frac{|x|_{max}}{2}$$

may be chosen, for example, as a least value (e.g., the least possible value) for single RF chain implementation.

Figure 5:
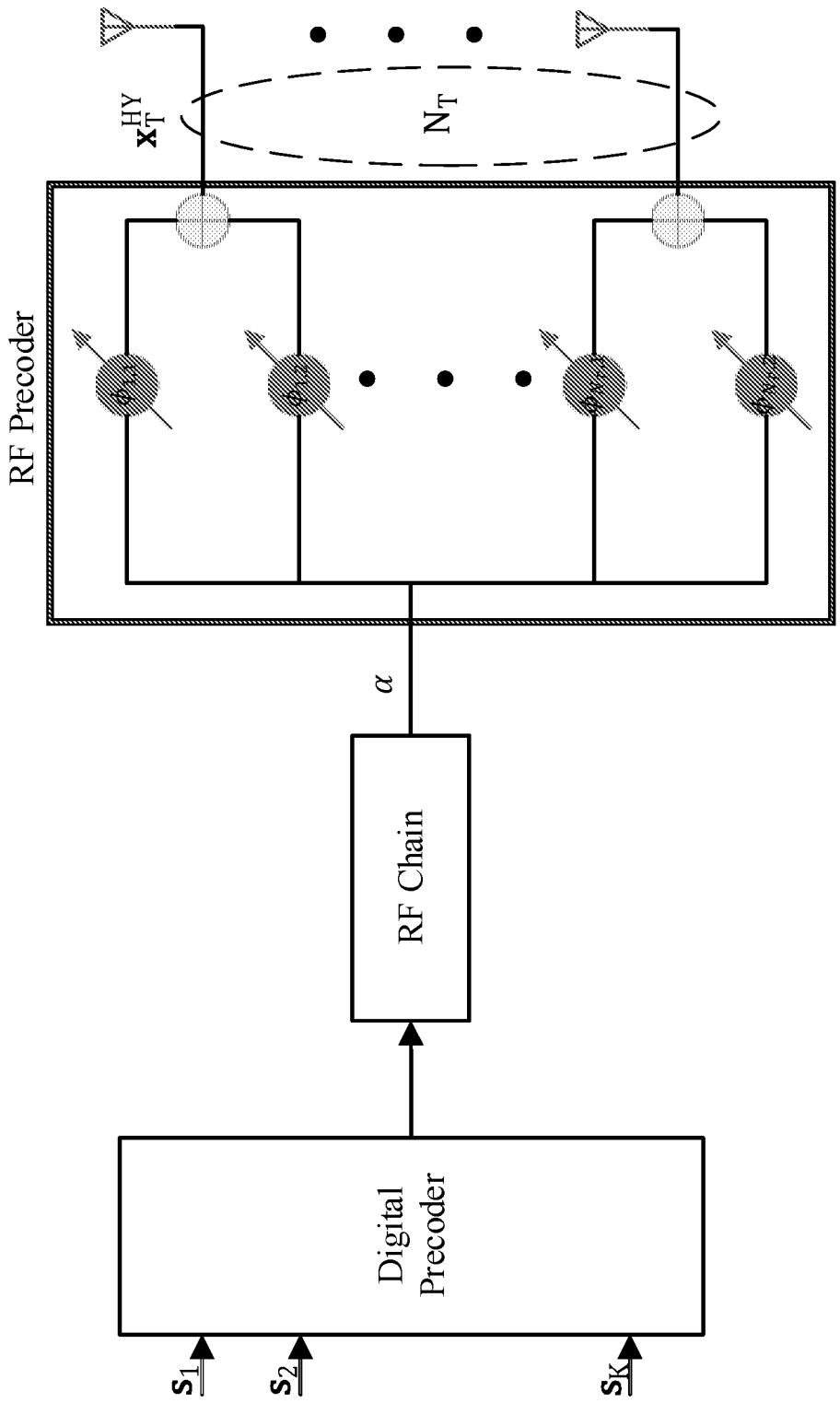
FIG. 5 illustrates an example of HADP with a single RF chain.

From Equation (16a), $x_{BB}^{HY} = \alpha[1 \ 1]^T$ may mean, for example, that both RF chains are producing the same signal. As shown in FIG. 5, the number of RF chains may be reduced to yield, for example, $N_{RF}=1$.

After solving Equation (13), $\mathcal{F}_D\{.\}$ may be found such that $\mathcal{F}_D\{s\} = x_{BB}^{HY}$. $\mathcal{F}_D\{.\}$ may be defined as a direct mapping from vector s to $x_{BB}^{HY}$ ((e.g., taking advantage of the digital domain). $\mathcal{F}_D\{.\}$ may be coded (e.g., hardcoded) to the desired output to $\mathcal{F}_D\{.\}$.

Vectors s may be given and $x_{BB}^{HY}$ may be a solution to Equation (13). $\mathcal{F}_D$ may be defined as:

$$\mathcal{F}_D: s \mapsto x_{BB}^{HY} \quad (17)$$

Function $\mathcal{F}_D$ may be defined with a singleton vector domain (e.g., s) and a singleton vector range (e.g., $x_{BB}^{HY}$). For the foregoing, s and $x_{BB}^{HY}$ may be given. Generalizing $P_D$ to $\mathcal{F}_D\{.\}$ may not result in a more complicated transformation. $\mathcal{F}_D\{.\}$ may be a cover to produce desired $x_{BB}^{HY}$ which may be required in Equation (13).

Figure 6:
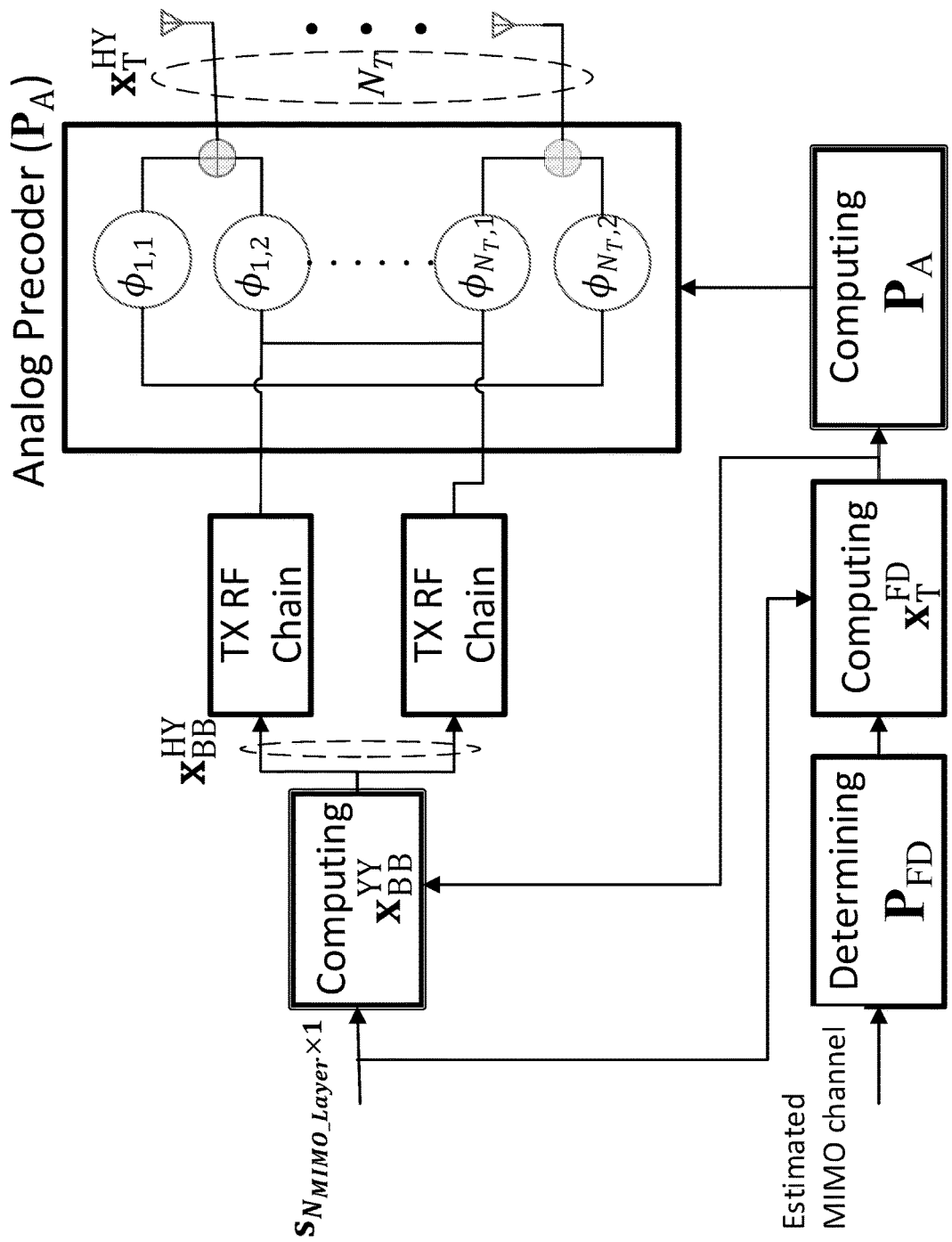
FIG. 6 illustrates an example HAPD with two RF chains.

FIG. 6 illustrates an exemplary design for realizing an FDP in HADP. In examples, the following may summarize an example design for realizing an FDP in HADP. One or more of the following may apply. s and $P_{FD}$ may be given. An output may be $x_T^{HY}$. The desired transmit signal may be calculated as: $x_T^{FD} = P_{FD}$ s. $P_A$ in Equation (14a) may be constructed by using Equation (16b) and Equation (16c). $x_{BB}^{HY}$ may be constructed from Equation (16a). $\mathcal{F}_D\{s\}$ may be constructed as Equation (17). $x_{BB}^{HY}$ may be fed to the RF chains. The output of RF chains may be fed to analog precoder $P_A$. The output of the RF precoder, e.g., $x_T^{HY}$ may be identical to $x_T^{FD}$.

In examples, the design for realizing an FDP in HADP may include one or more of the followings. s and $P_{FD}$ may be given. s may be an input vector (input symbol vector). $P_{FD}$ may a digital precoder. An output of the exemplary design described herein (e.g., output of the RF precoder) may be $x_T^{HY}$.

A transmit vector signal (e.g., or desired transmit vector signal $x_T^{FD}$) may be determined (e.g., calculated). For example, the transmit vector signal ($x_T^{FD}$) may be determined based on the digital precoder and the input symbol vector: $x_T^{FD} = P_{FD}$ s.

Figure 7:
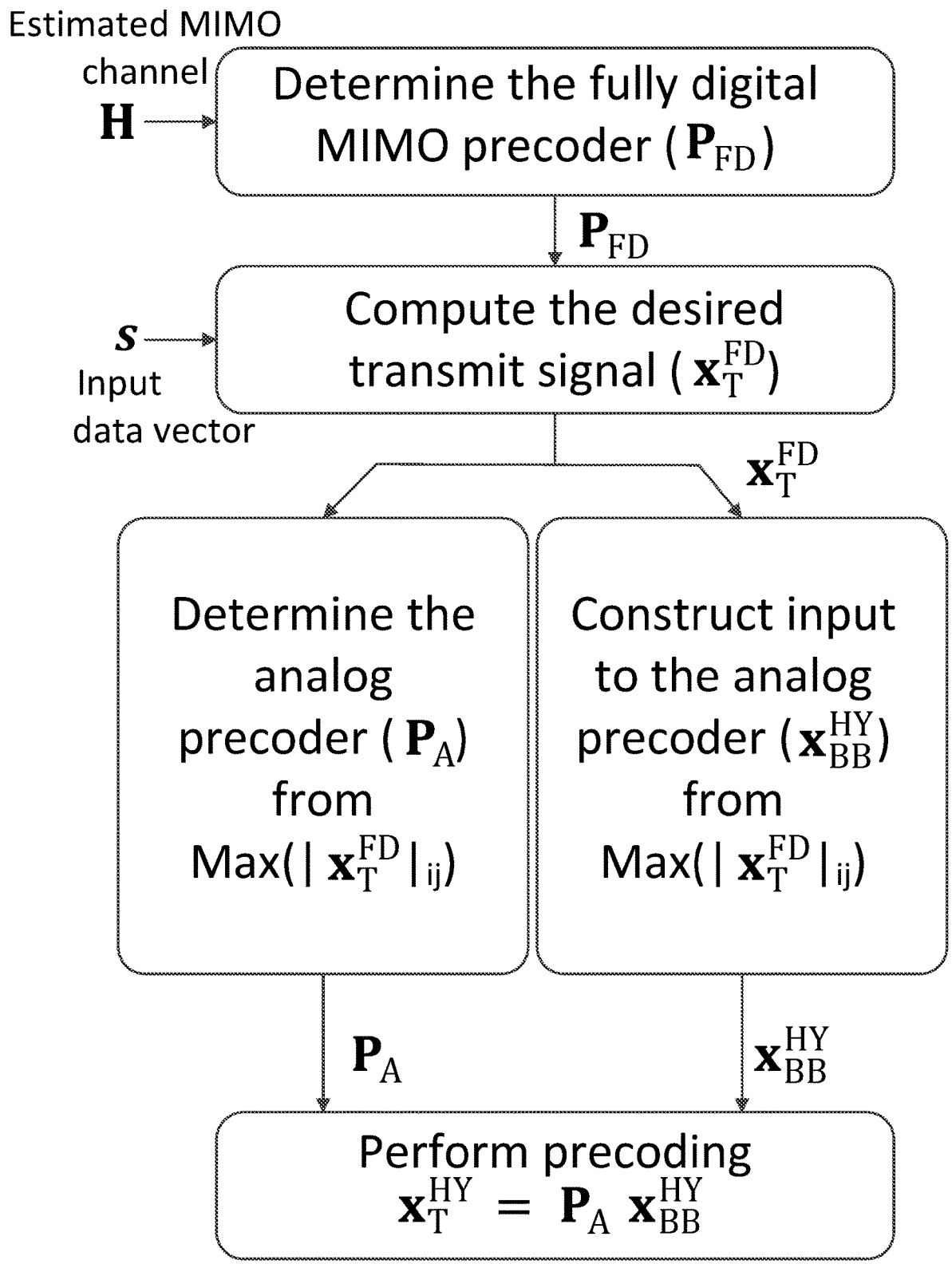
FIG. 7 illustrates an example diagram associated with precoding.

An analog precoder ($P_A$) may be determined (e.g., constructed). For example, the analog precoder ($P_A$) (e.g., from Equation (14a)) may be determined by using Equation (16b) and Equation (16c). In examples, the analog precoder ($P_A$) may be determined from maximum absolute values of $x_T^{FD}$ shown in FIG. 7.

An input baseband signal $x_{BB}^{HY}$ (e.g., input to the analog precoder) may be determined (e.g., constructed). The input baseband signal ($x_{BB}^{HY}$) may be determined from Equation (16a). In examples, the input baseband signal $x_{BB}^{HY}$ may be determined using maximum absolute values of $x_T^{FD}$ shown in FIG. 7.

$\mathcal{F}_D\{s\}$ may be constructed. For example, $\mathcal{F}_D\{s\}$ may be constructed using Equation (17). $\mathcal{F}_D\{s\}$ may represent the process described herein (e.g., the whole process described herein) as a transformation (e.g., non-linear transformation) that takes in the baseband symbol s to produce the transmit vector.

A number of RF chains may be determined. For example, the number of RF chains may be determined based on the determined input baseband signal $x_{BB}^{HY}$. The number of RF chains may be less than a number of transmitter antennas. If examples, the number of RF chains may be one RF chain. In examples, the number of RF chains may be two RF chains. In examples, if the determined input baseband signal $x_{BB}^{HY}$ is a complex number, the number of RF chains may be set to one RF chain. In examples, if the determined input baseband signal $x_{BB}^{HY}$ is a real number, the number of RF chains may be set to two RF chains.

The determined baseband signal ($x_{BB}^{HY}$) may be fed to the determined number of RF chains. The output of RF chains may be fed to the analog precoder $P_A$. The analog precoder $P_A$ may determine a beamforming signal $x_T^{HY}$. For example, the analog precoder $P_A$ may determine a beamforming signal $x_T^{HY}$ using the determined analog precoder and the output of the determined number of RF chains. The output of the RF precoder, e.g., $x_T^{HY}$, may be identical to $x_T^{FD}$. The determined beamforming signal $x_T^{HY}$ may be transmitted using the transmitter antennas.

Complexity order of the HADP may be in the order of the FDP (e.g., chosen FDP). For example, from the exemplary design described herein, determining the parameters $P_A$ (e.g., $P_A$ in Equation (14a) may be constructed by using Equation (16b) and Equation (16c)) and/or $x_{BB}^{HY}$ (e.g., $x_{BB}^{HY}$ may be constructed from Equation (16a)) may involve computation (e.g., extra computation). From Equation (14) and Equation (16), the complexity order of the computations (e.g., additional computations) may be $\mathcal{O}(N_T)$. For example, the complexity order of the additional computations $\mathcal{O}(N_T)$ may be less than computational complexity for calculating the digital precoder $P_{FD}$ (e.g., singular-value decomposition (SVD) and/or waterfilling).

A solution for $x_T^{FD}P=P_A x_{BB}^{HY}$ when $N_{RF}=2$ may be found (e.g., as described herein). For example, following the signal format stated in Equation (14a) and Equation (14b), $x_T^{FD}$ may be described as:

$$x_T^{FD} = \begin{bmatrix} e^{j\phi_{1,1}} & e^{j\phi_{1,2}} \\ e^{j\phi_{2,1}} & e^{j\phi_{2,2}} \\ \cdots & \cdots \\ e^{j\phi_{N_T,1}} & e^{j\phi_{N_T,2}} \end{bmatrix} \begin{bmatrix} \alpha_1 \\ \alpha_2 \end{bmatrix}$$

$$x_T^{FD} = \alpha_1 \begin{bmatrix} e^{j\phi_{1,1}} \\ e^{j\phi_{2,1}} \\ \cdots \\ e^{j\phi_{N_T,1}} \end{bmatrix} + \alpha_2 \begin{bmatrix} e^{j\phi_{1,2}} \\ e^{j\phi_{2,2}} \\ \cdots \\ e^{j\phi_{N_T,2}} \end{bmatrix} = \alpha_1\Phi_1 + \alpha_2\Phi_2$$

where $\Phi_1$ and $\Phi_2$ may be the split analog precoding vectors. $\alpha_1$, $\alpha_2$ may be positive real numbers. $\alpha_1$, $\alpha_2$ may be represented as real and/or imaginary components of a complex number $\in \mathbb{C}$. For example, $\alpha_1=\text{Real}(a)$ and/or $\alpha_2=\text{Im}(a)$, or vice versa. The transmit vector may be written as:

$$x_T^{FD} = \text{Real}(a)\Phi_1 + \text{Im}(a)\Phi_2$$
$$= 2(a+a^*)\Phi_1 + 2j(a-a^*)\Phi_2$$

The expression may be re-arranged (e.g., further re-arranged) as:

$$x_T^{FD}=2(\Phi_1+j\Phi_2)a+2j(\Phi_1-j\Phi_2)a^*$$

Figure 8:
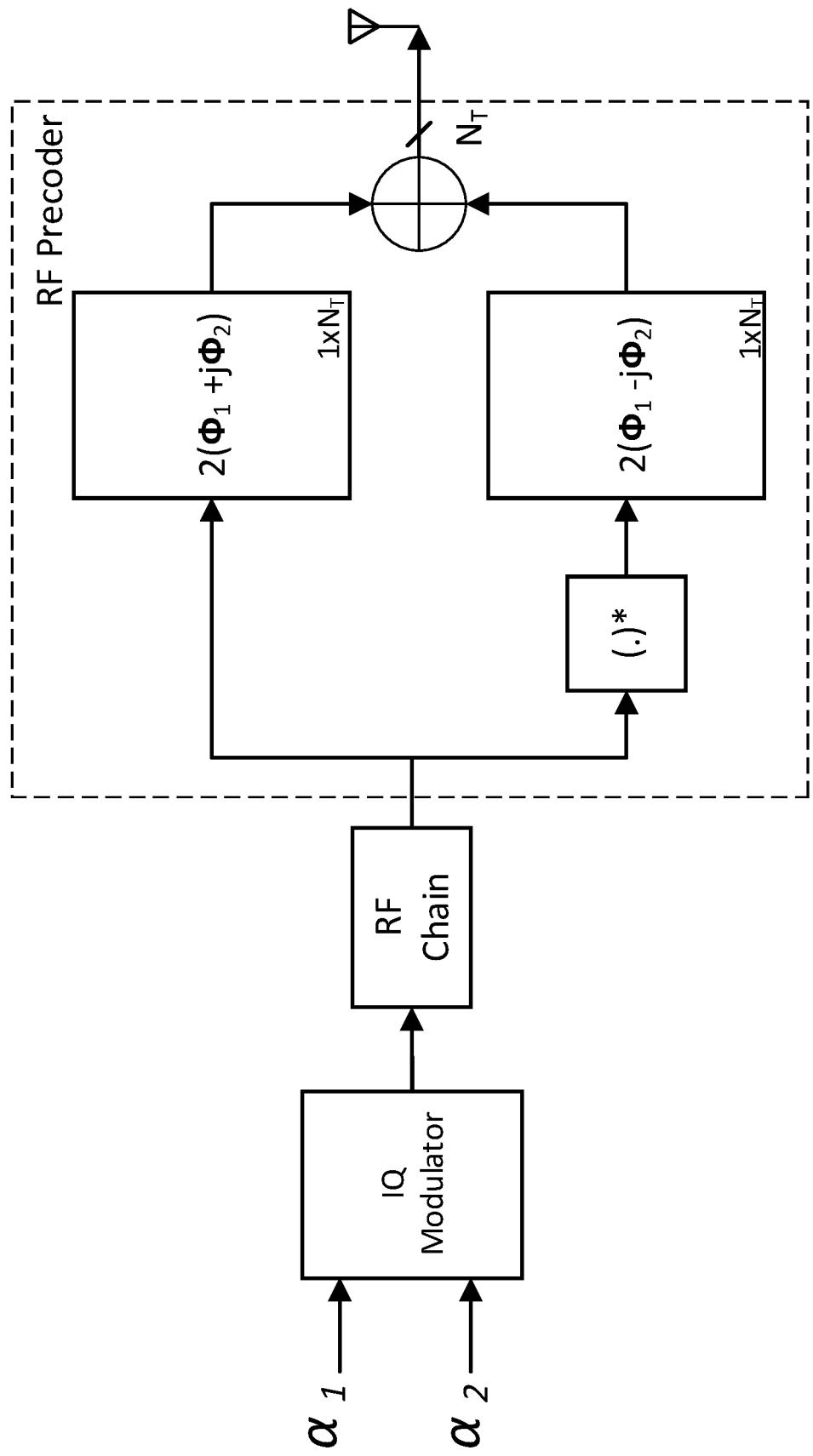
FIG. 8 illustrates an example HADP with a single RF chain.

FIG. 8 illustrates an example HAPD design with single RF chain. As shown in FIG. 8, by forming a complex input signal a (e.g., $\alpha_1$, $\alpha_2$), the number of RF chains may be reduced (e.g., further reduced). For example, the number of RF chains may be further reduced to yield $N_{RF}=1$. Re-arranging of the signal structure may be implemented.

Simulation results for one or more designs associated with realizing FDP in HADP may compare the number of RF chains (e.g., the required number of RF chains). The design for realizing FDP in HADP as described herein may have the least number of RF chains (e.g., 2 RF chains). One or more designs used as comparisons for the simulation results may need $2N_s$ RF chains (e.g., for multi-stream needs) and/or may need $N_s$ RF chains.

Figure 9:
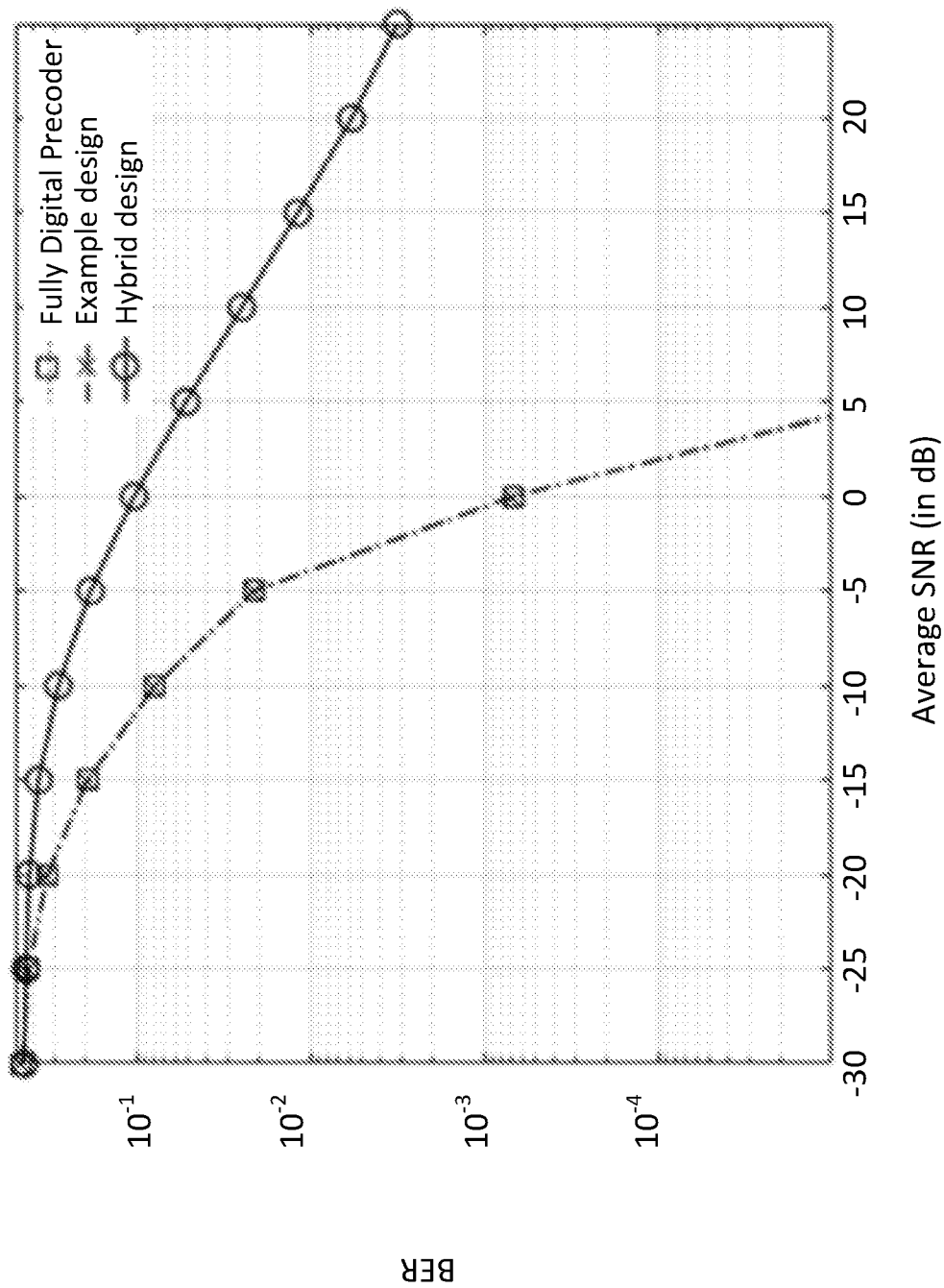
FIG. 9 illustrates an example of bit error rate (BER) versus signal to noise ratio (SNR) for implementations in a 64×8 massive-MIMO system.

FIG. 9 illustrates an example of bit error rate (BER) versus signal to noise ratio (SNR) for implementations in a 64×8 massive-MIMO system. The simulation may use the exemplary design described herein for comparing with one or more other designs. The simulation, for example, may have a 64 massive-MIMO transmitter, and the same channel model with L=15 paths from transmitter to the receiver. Fully digital decoding at the receiver with 8 antennas may be used (e.g., to exclude effect of the decoder and/or combiner at the receiver). FIG. 9 illustrates the BER versus SNR of the system for $N_s=8$ and QPSK constellation over 100 channel realization in SNR (e.g., each SNR). The design described herein (e.g., 2 RF chains) may have (e.g., need) $N_{RF}=N_s=8$ RF chains. The FDP $P_{FD}$ may be chosen as a digital precoding that may have more than 20 dB gain. As shown in FIG. 9, the exemplary design described herein provides identical result to the fully digital precoder result.

One or more hybrid analog/digital beamformer exemplary systems may be described herein. For example, examples of hybrid analog/digital beamformer system may be based on a single RF chain architecture described herein.

A desired signal vector x of size M in RF domain with single RF chain may be generated (e.g., using the single RF chain architecture described herein). $S_M(x, \alpha)$ may be a primary block and may generate the given signal x in RF domain if RF signal a is fed to it. FIG. 10 illustrates an example of $S_M(x, \alpha)$ block. $S_M(x, \alpha)$ may represent a process after generating of the baseband signal to the RF at the antenna.

Figure 11:
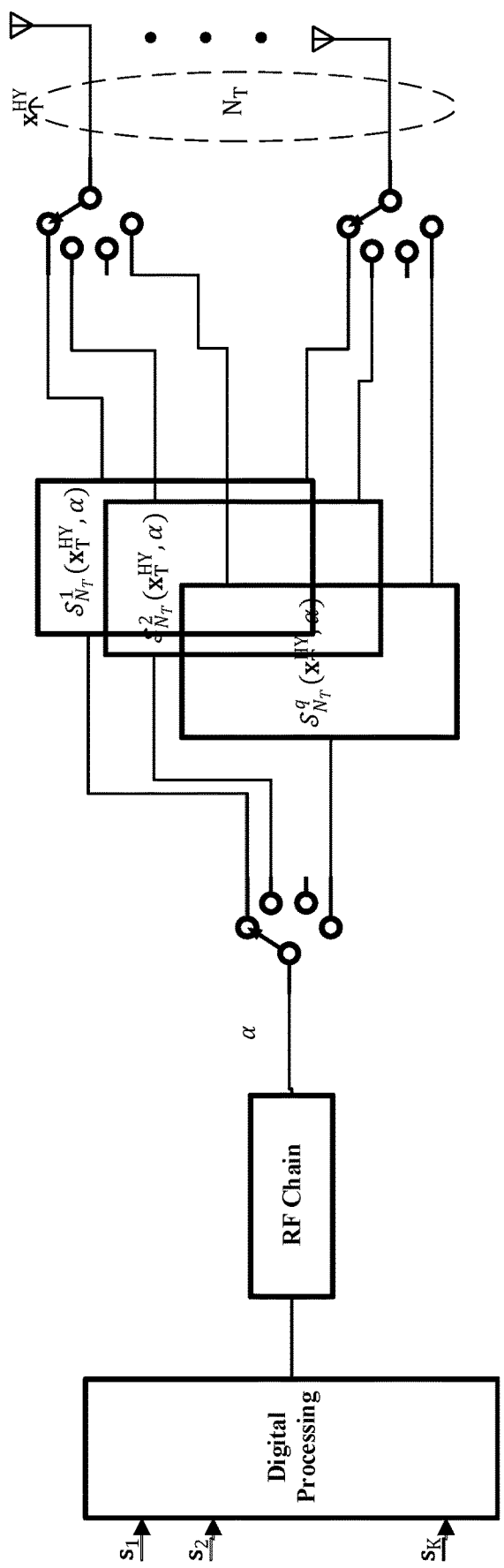
FIG. 11 illustrates an example phase shifter bank beamformer.

The example design for realizing an FDP in HADP described herein may update (e.g., be required to update) the analog precoder (e.g., at each symbol period $T_s$). In examples, a specification(s) of the phase shifters for an implementation may not be able to update analog precoder at each symbol period $T_s$. If an implementation cannot update the analog precoder at each symbol period $T_s$, a phase shifter bank single RF chain hybrid beamformer may be used as described herein, e.g., as illustrated in FIG. 11. If the update rate of the phase shifter is $T_p$, the exemplary phase shifter bank beamformer shown in FIG. 11 may configure (e.g., require) the phase shifter bank of size $$q \geq \left\lceil \frac{T_p}{T_s} \right\rceil.$$

$\lceil a \rceil$ may denote the smallest integer that is greater than a. Output of the RF chain may be connected to an analog switch (e.g., multiplexer) and the switch may select the analog beamformers (e.g., each of the analog beamformers) in turn. The (e.g., each) analog beamformer and the (e.g., each) phase shifter may (e.g., must) be updated $qT_s \geq T_p$. The (e.g., each) antenna may be fed from an analog switch, which may select the active analog precoder.

The FDP matrix may be written as:

$$P_{FD}=[p^1, p^2, \ldots, p^{N_s}]$$

where $p^i$'s may be columns of the precoder matrix. Having $s=[s_1, s_2, \ldots, s_{N_s}]^T$, p may be defined as:

$$p = \begin{bmatrix} p^1 \\ p^2 \\ \vdots \\ p^{N_s} \end{bmatrix} \in C^{N_T N_s}$$

and S may be defined as:

$$S=[s_1 I_{N_T}, s_2 I_{N_T}, \ldots, s_{N_s} I_{N_T}] \in C^{N_T \times N_T N_s}.$$

The precoded signal $x_T^{FD}=P_{FD}s$ may be written as:

$$x_T^{FD}=Sp$$

Using the example design for realizing an FDP in HADP described herein, vector p may be generated by one RF chain, and matrix S may be implemented by phase shifter and switches.

Figure 12:
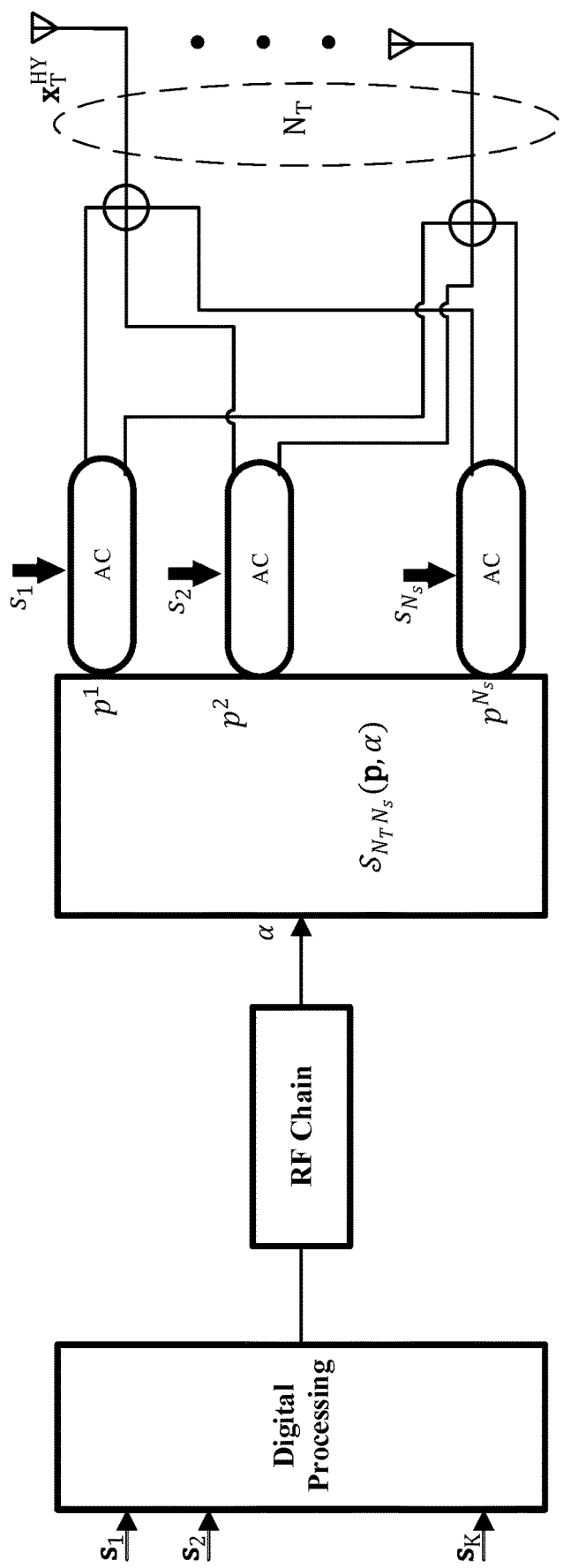
FIG. 12 illustrates an example analog constellation beamformer.
Figure 13:
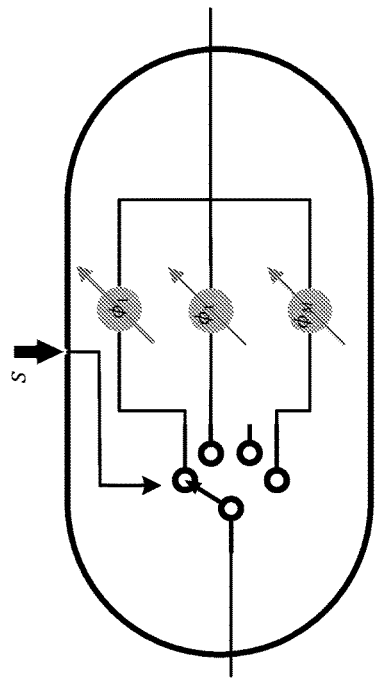
FIG. 13 illustrates an example analog constellation block for M-PSK.
Figure 14:
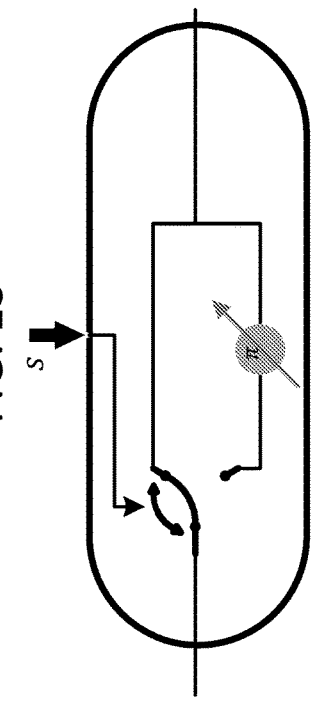
FIG. 14 illustrates an example analog constellation block for BPSK.
Figure 15:
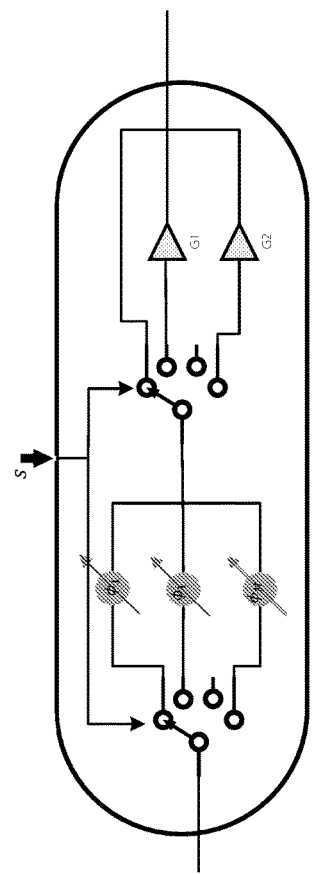
FIG. 15 illustrates an example analog constellation block for M-QAM.

FIG. 12 illustrates an example structure where an analog constellation block may be used. FIGS. 13-15 illustrate exemplary analog constellation blocks. FIG. 13 illustrates an analog constellation block for M-PSK. FIG. 14 illustrates an analog constellation block for binary phase-shift keying (BPSK). The block for BPSK shown in FIG. 15 may include one switch and one phase shifter (e.g., fixed phase shifter). If amplifiers are utilized in the RF domain, other constellations (e.g., M-QAM) as shown in FIG. 15 may be implemented.

The update rate of phase shifter described herein may be associated with the channel coherence time.

Figure 16:
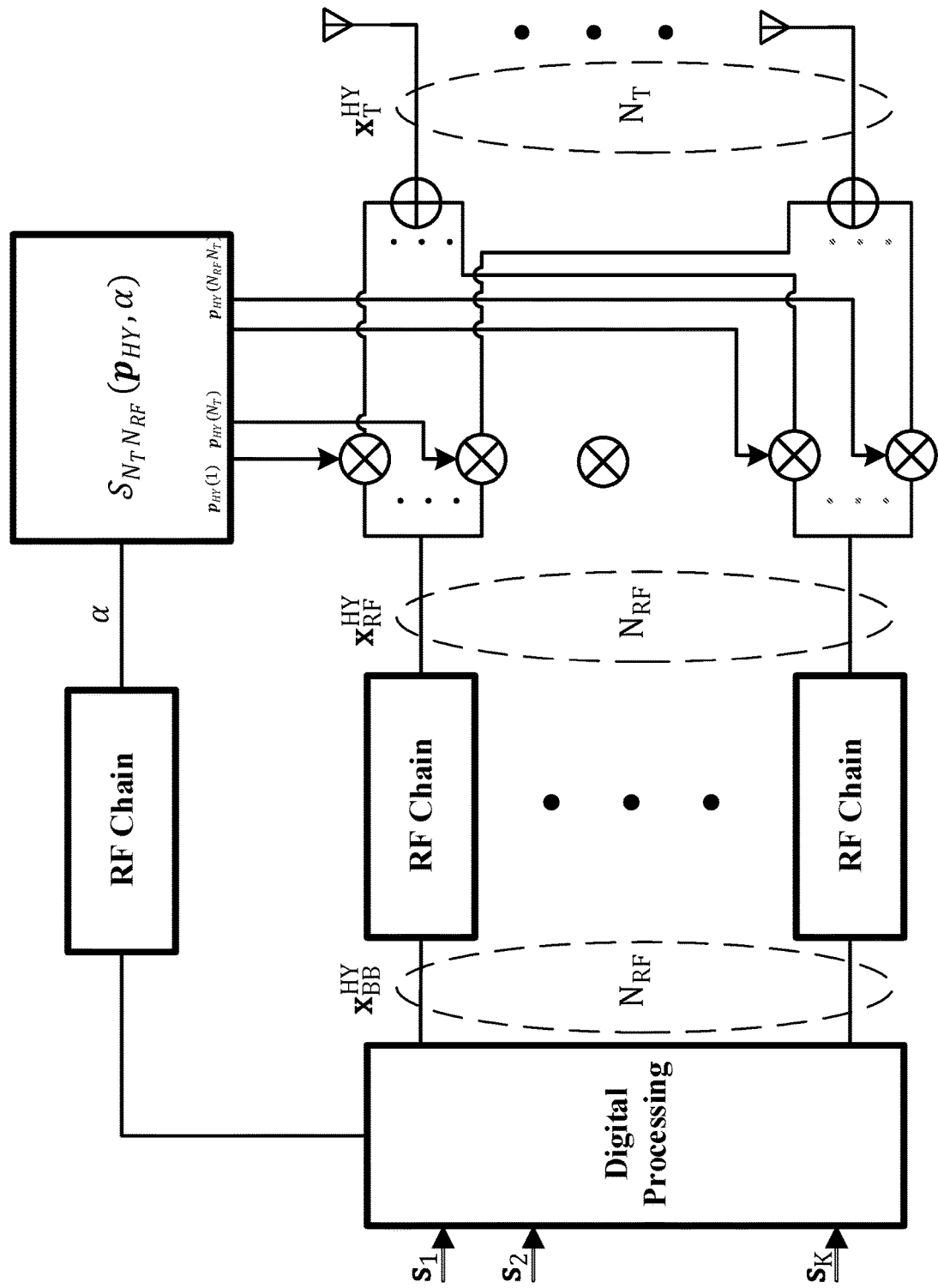
FIG. 16 illustrates an example hybrid beamformer with RF multiplier.

Hybrid beamformer may include a RF multiplier. For example, a hybrid beamforming may have a structure which may relax the unit modulus constraints of the analog precoder. FIG. 16 illustrates an example hybrid beamformer with RF multiplier. One or more different hybrid signal processing systems may be designed (e.g., based on the hybrid beamforming structure shown in FIG. 16) that may or may not limit analog precoder coefficient to be on unit circle. FIG. 16 depicts an example block diagram of hybrid signal processing as described herein.

The output of the system shown in FIG. 16 may be:

$$X_T^{HY}=P_{HY}x_{RF}^{HY}.$$

$P_{HY}=[p_{HY}^1,p_{HY}^2,\ldots,p_{HY}^{N_{RF}}]\in C^{N_T \times N_{RF}}$ may be a precoder (e.g., new precoder), and $p_{HY}$ may be the vectorization of $P_{HY}$:

$$p_{HY} = \begin{bmatrix} p_{HY}^1 \\ p_{HY}^2 \\ \vdots \\ p_{HY}^{N_{RF}} \end{bmatrix} \in C^{N_T N_{RF}}$$

The coefficients of the precoder (e.g., $p_{HY}$) may be generated by the example design for realizing an FDP in HADP described herein. For example, the coefficients of the precoder may be generated using one RF chain and analog multipliers, and adders may be used to generate $x_T^{HY}$. $P_{HY}$ may be set to $P_{HY}=P_{FD}$, and $x_{RF}^{HY}$ may be set to $x_{RF}^{HY}=s$. One or more decompositions of $P_{FD}$ may minimize number of RF chains and/or other analog components (e.g., multipliers and/or adders).

A single RF chain design for realizing a given FDP in wideband massive-MIMO-OFDM communication systems may be described herein.

For example, in a MIMO-OFDM system (e.g., massive-MIMO-OFDM system) with $N_c$ subcarriers and $N_T$ antennas, $N_T N_c$ symbols may be transmitted. $x_i(k)$ may represent data sent from $k^{th}$ tone of the $i^{th}$ antenna in frequency domain. The matrix $X=[x_1^H, x_2^H, \ldots, x_{N_T}^H]^H$ of size $N_T \times K$ may be sent, where $x_i=[x_i(1), x_i(2), \ldots, x_i(N_c)]$ is transmitted signal from ith antenna which may go through (e.g., first go through) inverse fast Fourier transform (IFFT) block to be converted to the time domain and after appending cyclic prefix $y_i=[y_i(1), y_i(2), \ldots, y_i(N)]$ is transmitted by $i^{th}$ antenna. In time domain, the matrix $Y=[y_i(n)]$ for i=1, 2, \ldots, $N_T$ and k=1, 2, \ldots, N of size $N_T \times N$ may be sent where $y_i(n)$ is the transmitted signal from $i^{th}$ antenna in $n^{th}$ time instance. N may be $N=N_c+L_c$. $L_c$ may be the length of the cyclic prefix. The length of the cyclic prefix may be determined according to the channel response time delay profile. The exemplary design described herein may not have a constraint(s) on N and may allow a higher resolution IFFT to be used (e.g., for practical system). F may be defined as the operations which may convert frequency signal $x_i$ to time signal $y_i$:

$$y_i=F(x_i) \quad (7.1)$$

which in plain OFDM may be IFFT and appending cyclic prefix. A transformation F (e.g., generic transformation F) may be provided (e.g., for generality purpose).

In FDP beamforming, at a (e.g., each) subcarrier, $N_S$ symbols may be precoded. The columns of X may consider:

$$X=[x^1,x^2,\ldots,x^{N_c}] \quad (7.2)$$

and $x^j$ may be:

$$x^j=P^j s^j \quad (7.3)$$

for j=1, 2, \ldots, $N_c$, where $s^j \in A^{N_s}$ may be the symbol vector of the $j^{th}$ frequency tone, and $V^j \in C^{N_T \times N_s}$ may be the FDP at frequency tone j.

For single RF chain design as described herein, the symbol vectors $s^j$ may be given. For example, at each transmission (e.g., time slot), for j=1, 2, \ldots $N_c$, the symbol vectors $s^j$ may be given, and the set of FDP precoders may be computed according to the chosen precoding scheme. Matrix X (e.g., first matrix X) may be calculated using Equation 7.3 and then its rows. For example, $x_i$'s may be used to compute the time domain signals $y_i$ to generate matrix Y. The matrix Y may be written as $Y=[y^1, y^2, \ldots, y^N]$, where $y^j$ may be its columns. For systems with $N_T$ RF chains, each column may be transmitted (e.g., required to be transmitted). The single RF chain design described herein may need (e.g., require) only one RF chain. In order to transmit Y, each column $y_i$ may be transmitted using the exemplary design for realizing an FDP in HADP as described herein. $x_T^{FD}$ from the exemplary design for realizing an FDP in HADP as described herein may be modified to set $x_T^{FD}=y_i$.

In examples, an FDP may have the time domain transmitted signal of an antenna (e.g., each antenna) as one or more of the following: (I) $x_i^{TI}(t)$ may be the OFDM symbol in time domain transmitted form ith antenna; and/or (II) $x_i^{FR}(f)$ may be the OFDM symbol in frequency domain transmitted form ith antenna.

In examples where $x_i^{TI}(t)$ is the OFDM symbol in time domain transmitted form ith antenna, $x_i^{TI}[n]$ may be $x_i^{TI}[n]=x_i^{TI}(nT_s)$, e.g., time sample at $nT_s$, where $T_s=1/F_s$ and $F_s$ may be the sampling frequency.

In examples where $x_i^{FR}(f)$ is the OFDM symbol in frequency domain transmitted form ith antenna, $x_i^{FR}[k]$ may be the transmitted symbol at kth subcarrier.

FDP may be realized with $N_{RF}$ RF chains that:
for i=1, 2, \ldots, $N_T$, m=1, 2, \ldots, M, and p=1, 2, \ldots, $N_{RF}$, $x_{m,p}(t)$ and $e^{j\phi_{m,p}^i}$ may exist such that:

$$x_i^{TI}(t) = \sum_{p=1}^{N_{RF}} \sum_{m=1}^{M} e^{j\phi_{m,p}^i} x_{m,p}(t),$$

where for each p and m≠m̂

$$\mathrm{supp}(x_{m,p}(t)) \neq \mathrm{supp}(x_{\hat{m},p}(t)).$$

The OFDM signal $x_i^{TT}(t)$ may be a complex function in time. In a communication systems, $\cos(\omega_c t)$ and $\sin(\omega_c t)$ may be used as carriers for the real and imaginary parts of $x_i^{TT}(t)$, respectively. $\Re_i(t)$ and $\Im_i(t)$ may represent the in-phase and quadrature RF components of the HADP output:

$$\Re_i(t) = \sum_{p=1}^{N_{RF}} \sum_{m=1}^{M} x_{m,p}^{I}(t) \cos(\omega_c t + \phi_{m,p}^{i})$$

$$\Im_i(t) = \sum_{p=1}^{N_{RF}} \sum_{m=1}^{M} x_{m,p}^{Q}(t) \sin(\omega_c t + \theta_{m,p}^{i})$$

where $x_{m,p}^{I}(t)$ and $x_{m,p}^{Q}(t)$ may be real values functions in time.

With sampling frequency $Fs=1/T_s$, total duration of the OFDM symbol may be $t \in [0, T_s N]$, where $N=N_c+N_{cp}$.

Using Example 1 as described herein, one or more of the following may be true for realization of FDP in OFDM HADP for an arbitrary integer M≤N.

In examples, $N_{RF}$ may be $$N_{RF} = \frac{N}{M}.$$

In examples, for $N_{RF} \geq 1$, $x_{m,p}^{I}(t)$, $x_{m,p}^{Q}(t)$, $\phi_{m,p}^{i}$, and $\theta m,p^i$ may exist using Example 1, such that:

$$\mathrm{Real}(x_i^{TT}[n]) = \Re_i(nT_s)$$

$$\mathrm{Imag}(x_i^{TT}[n]) = \Im_i(nT_s).$$

In examples, choosing a M (e.g., large M) may increase the signal bandwidth (e.g., output signal bandwidth).

FIG. 17-22 illustrates a visual example of OFDM symbol described herein.

A real part of the signal (e.g., in-phase component) is presented in one or more examples shown in FIGS. 17-22. The presentation may be valid for an imaginary part of the signal.

FIG. 17-22 illustrate example simulations performed with following parameters:
N$_c$=16;
N$_{cp}$=2;
Fc=6 GHz;
BW=2 MHz;
Simulation sampling frequency=10F$_c$;
16 QAM modulation.

Figure 17:
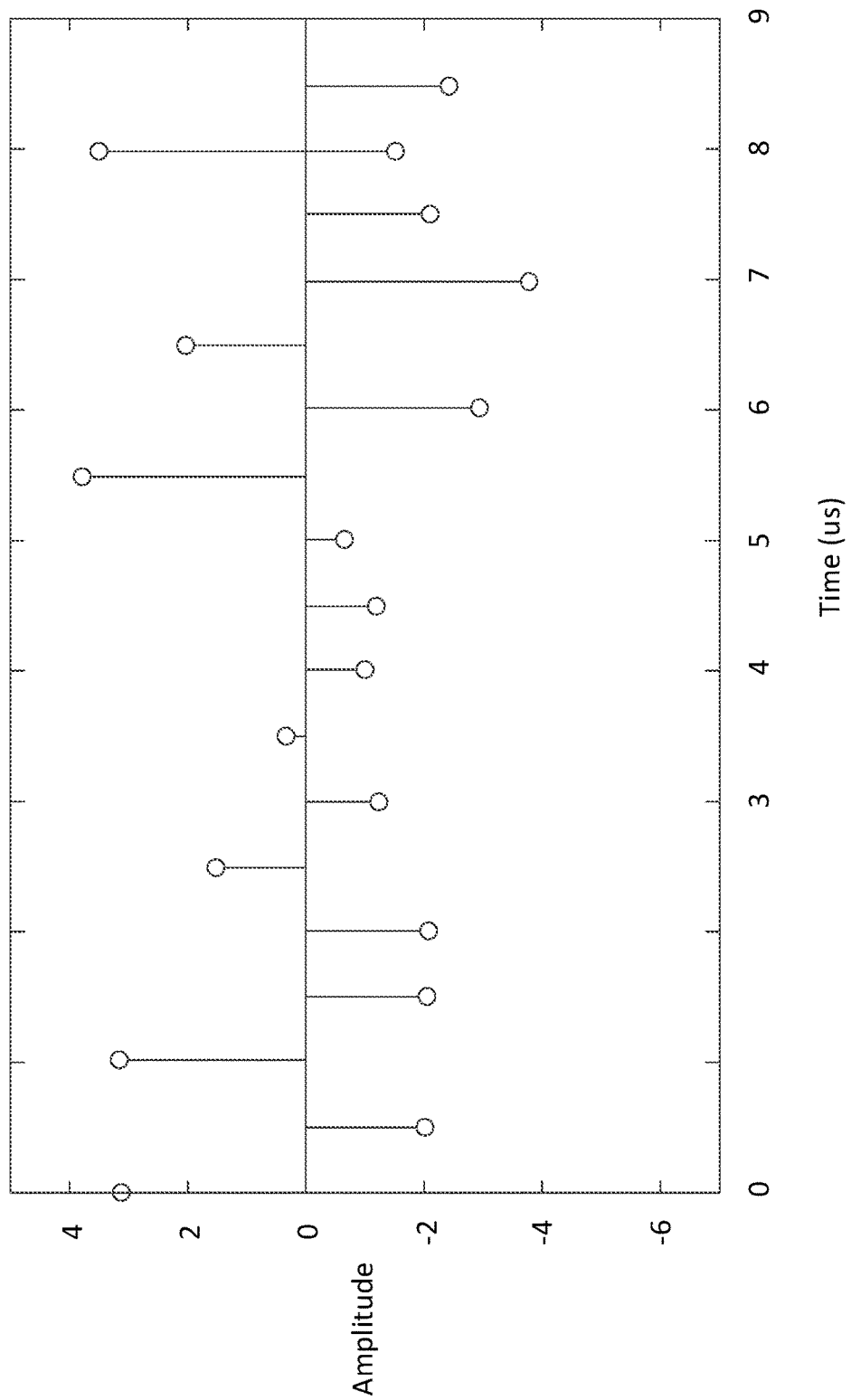
FIG. 17 illustrates an example simulation of digital OFDM signal.

Precoding (e.g., optimal and/or given precoding) in frequency domain may be performed, e.g., to build a digital OFDM signal for an antenna (e.g., each antenna) and may be shown in FIG. 17.

Figure 18:
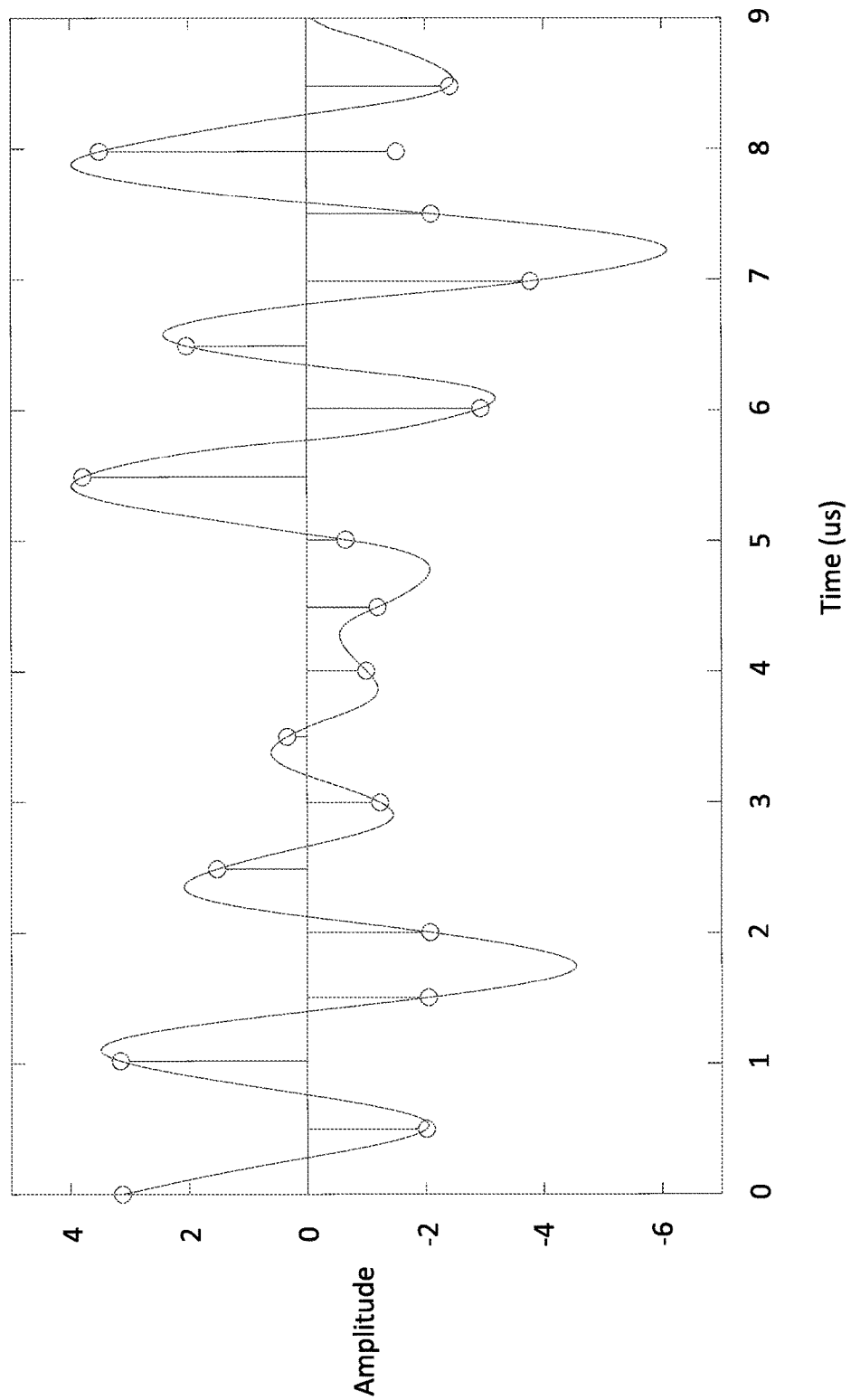
FIG. 18 illustrates an example simulation of analog OFDM signal.

Analog OFDM signal may be shown in FIG. 18.

Figure 19:
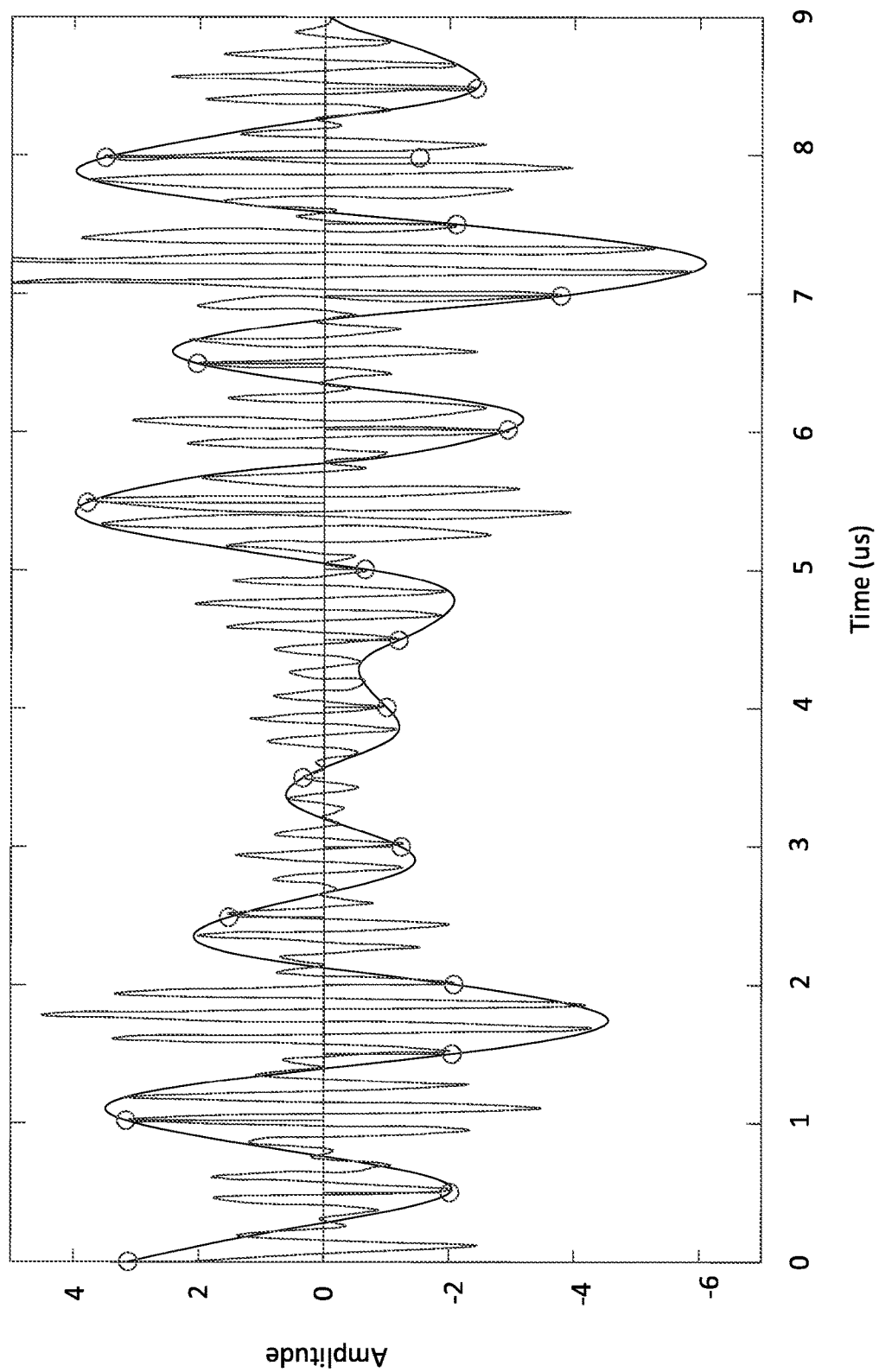
FIG. 19 illustrates an example simulation of RF modulated OFDM symbol.

RF Modulated OFDM symbol may be shown in FIG. 19.

For M=9, $N_{RF}$ may be set to 2 (e.g., $N_{RF}$=2) and the RF signal generated by an RF chain (e.g., each RF chain) may be written as:

$$x_{RF}^{1}(t) = \Sigma_{m=1}^{9} x_{m,1}^{I}(t) \cos(\omega_c t);$$

$$x_{RF}^{2}(t) = \Sigma_{m=1}^{9} x_{m,2}^{I}(t) \cos((\omega_c t).$$

Figure 20:
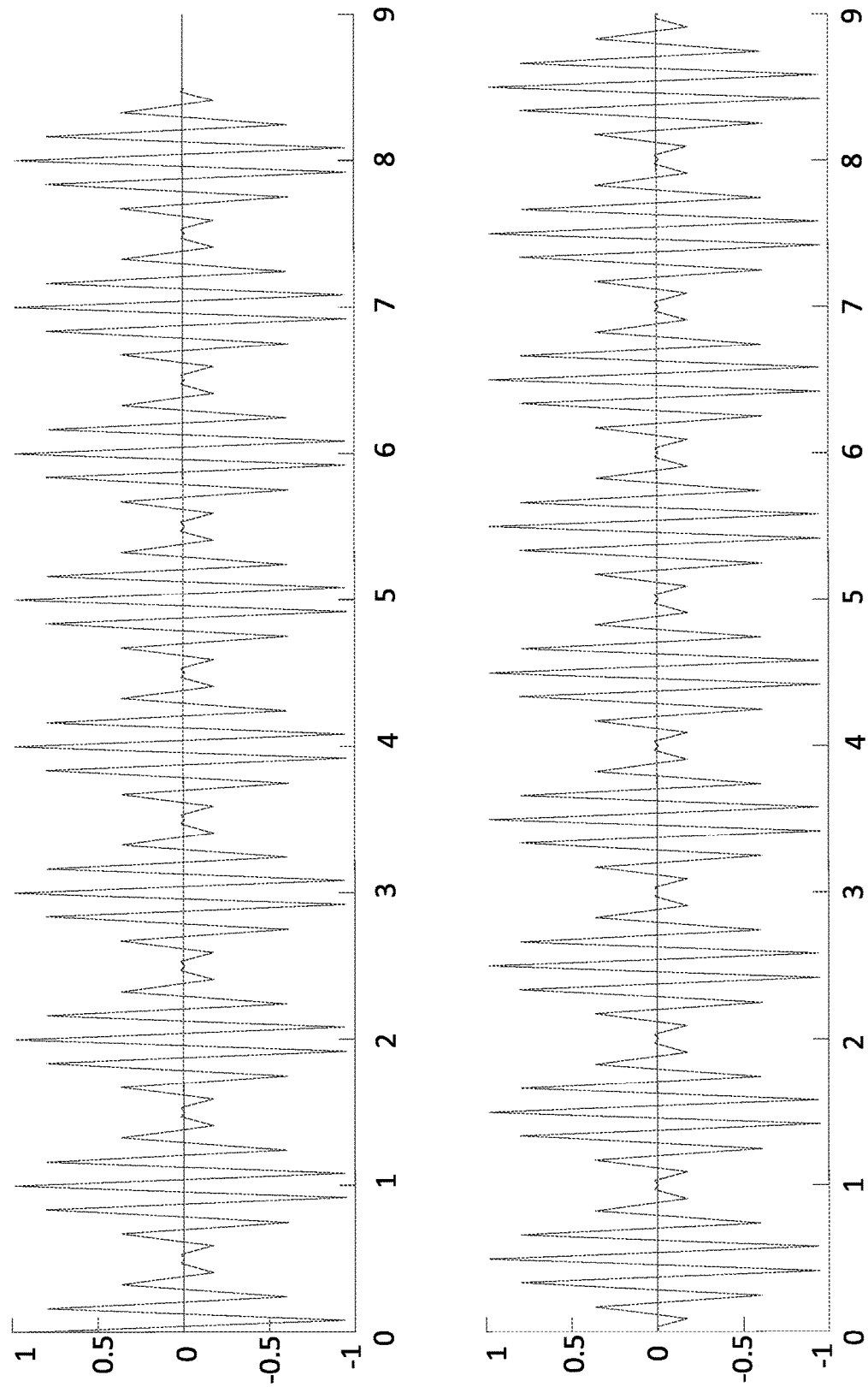
FIG. 20 illustrates an example simulation of OFDM symbol when M=9, and $N_{RF}$=2.
Figure 21:
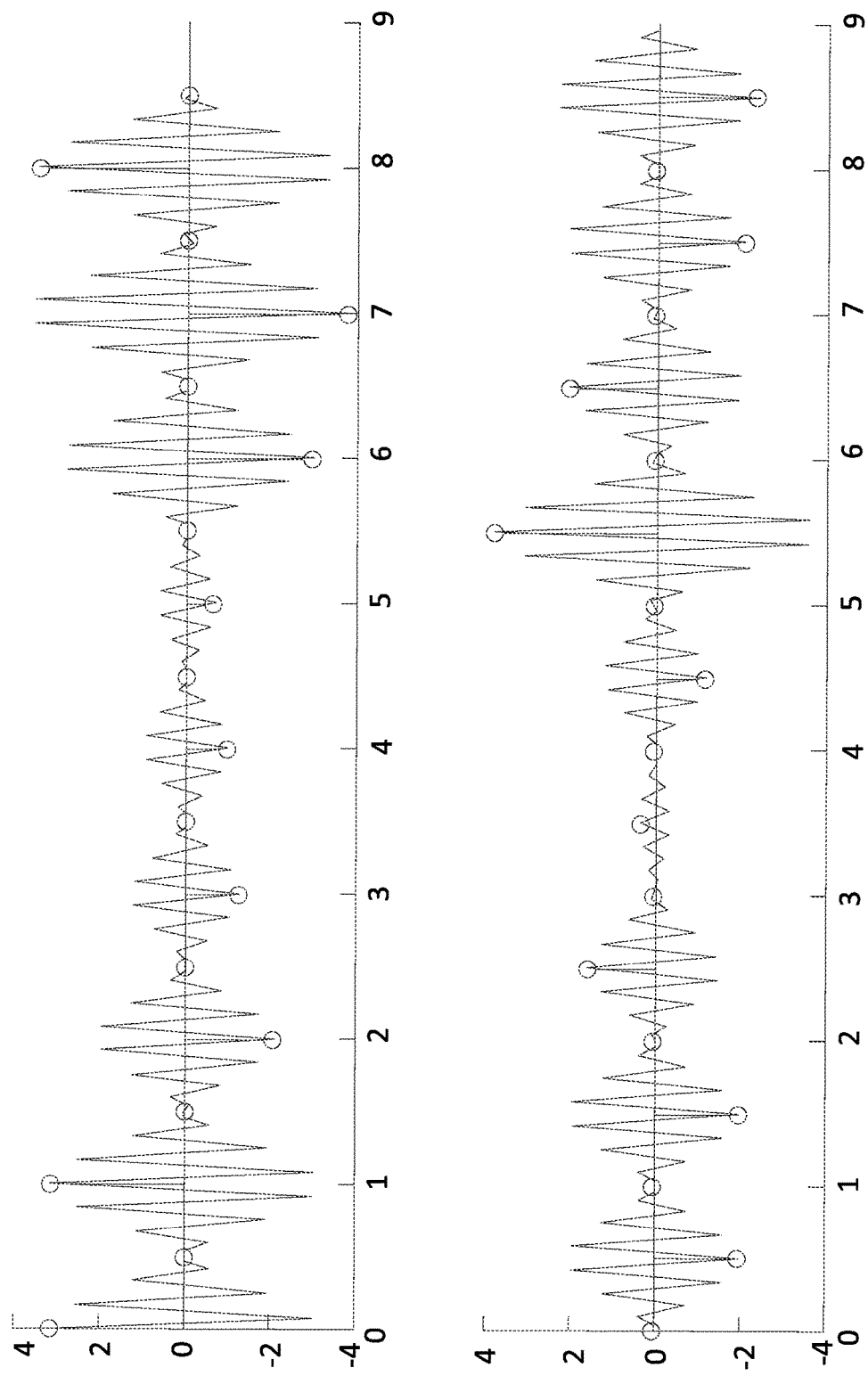
FIG. 21 illustrates an example simulation where $x_{RF}^1(t)$ and $x_{RF}^2(t)$ pass through RF precoders designed from Example 1.

FIG. 20 illustrates OFDM symbol when M=9, and $N_{RF}$=2. $x_{RF}^{1}(t)$ and $x_{RF}^{2}(t)$ may pass through RF precoders. For example, $x_{RF}^{1}(t)$ and $x_{RF}^{2}(t)$ may pass through RF precoders designed from Example 1, as shown in FIG. 21.

Figure 22:
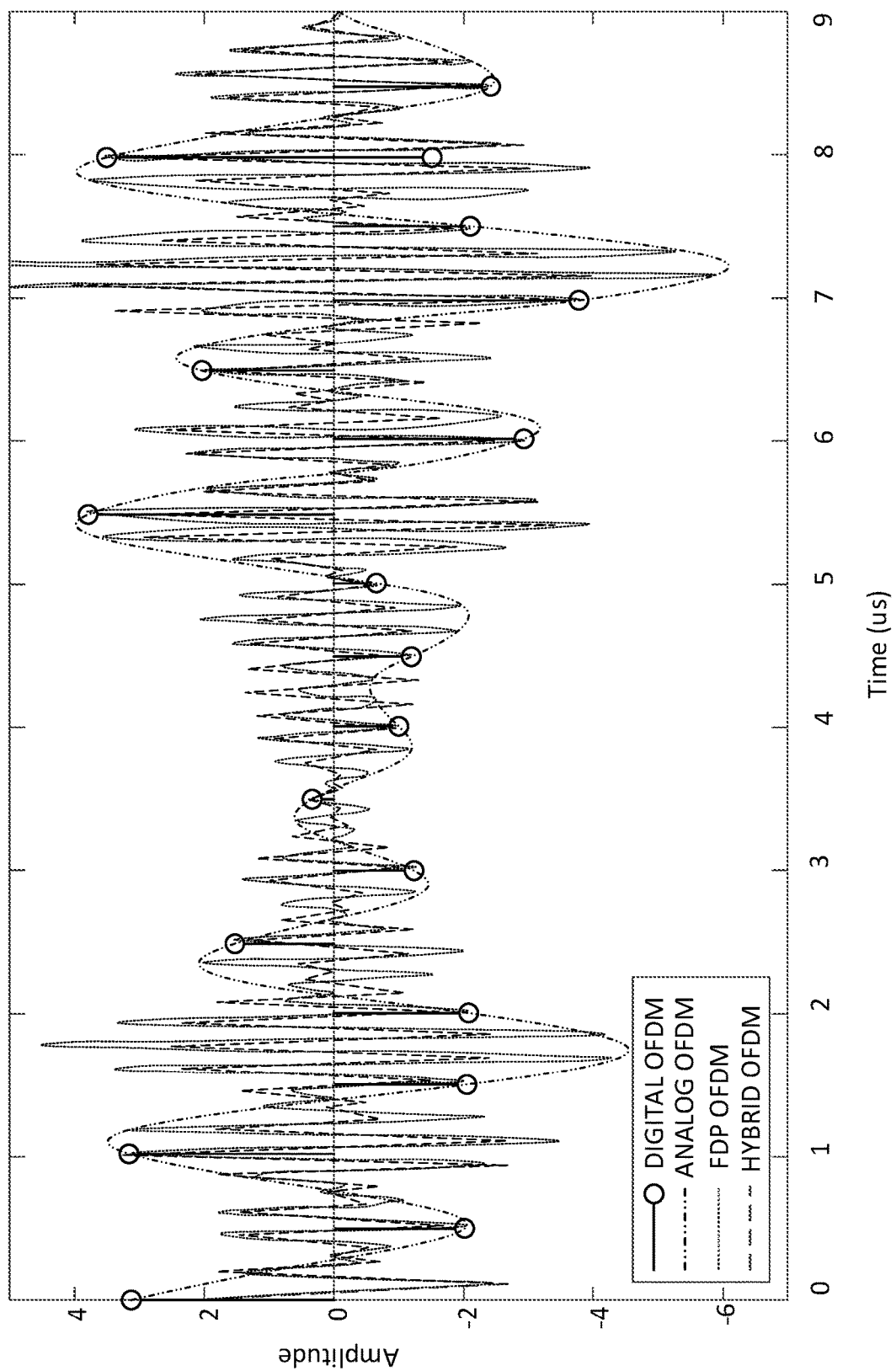
FIG. 22 illustrates an example simulation of hybrid precoded OFDM having same sample point values as the FDP.

FIG. 22 illustrates that at the sampling points, the hybrid precoded OFDM may have a similar or same value as the FDP. The performance of the HADP may be similar or the same as FDP with perfect sampling and perfect channel compensation.

The hybrid signal may have frequency components (e.g., higher frequency components). For example, the hybrid signal may have higher frequency components, which may be filtered or reduced by decreasing M.

Each of the computing systems described herein may have one or more computer processors having memory that are configured with executable instructions or hardware for accomplishing the functions described herein including determining the parameters described herein and sending and receiving messages between entities (e.g., WTRU and network) to accomplish the described functions. The processes described above may be implemented in a computer program, software, and/or firmware incorporated in a computer-readable medium for execution by a computer and/or processor.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

What is claimed:

1. A device comprising:
  a processor configured to:
    receive data to be transmitted, the data comprising an input symbol vector;
    determine a transmit vector signal based on a digital precoder and the input symbol vector;
    determine a maximum absolute value of the transmit vector signal;
    determine an analog precoder based on the determined maximum absolute value of the transmit vector signal;
    determine a baseband signal based on the determined transmit vector signal;
    determine a number of radio frequency (RF) chains based on the determined baseband signal, wherein the number of RF chains is less than a number of transmitter antennas;
    feed the baseband signal to the determined number of RF chains;
    determine a beamforming signal based on the determined analog precoder and an output of the determined number of RF chains; and
    transmit the determined beamforming signal using the number of transmitter antennas.

2. The device of claim 1, wherein the number of RF chains is set to one RF chain.

3. The device of claim 2, wherein the number of RF chains is set to one RF chain on a condition that the determined baseband signal is a complex number.

4. The device of claim 1, wherein the number of RF chains is set to two RF chains.

5. The device of claim 4, wherein the number of RF chains is set to two RF chains on a condition that the determined baseband signal is a real number.

6. The device of claim 1, wherein to determine the baseband signal, the processor is configured to:
determine the baseband signal based on the determined maximum absolute value of the transmit vector signal.

7. A method comprising:
receiving data to be transmitted, the data comprising an input symbol vector;
determining a transmit vector signal based on a digital precoder and the input symbol vector;
determining a maximum absolute value of the transmit vector signal;
determining an analog precoder based on the determined maximum absolute value of the transmit vector signal;
determining a baseband signal based on the determined transmit vector signal;
determining a number of radio frequency (RF) chains based on the determined baseband signal, wherein the number of RF chains is less than a number of transmitter antennas;
feeding the baseband signal to the determined number of RF chains;
determining a beamforming signal based on the determined analog precoder and an output of the determined number of RF chains; and
transmitting the determined beamforming signal using the number of transmitter antennas.

8. The method of claim 7, wherein the number of RF chains is set to one RF chain.

9. The method of claim 8, wherein the number of RF chains is set to one RF chain on a condition that the determined baseband signal is a complex number.

10. The method of claim 7, wherein the number of RF chains is set to two RF chains.

11. The method of claim 10, wherein the number of RF chains is set to two RF chains on a condition that the determined baseband signal is a real number.

12. The method of claim 7, wherein determining the baseband signal comprises:
determining the baseband signal based on the determined maximum absolute value of the transmit vector signal.

13. A device comprising:
a processor configured to:
receive data to be transmitted, the data comprising an input symbol vector;
determine a transmit vector signal based on a digital precoder and the input symbol vector;
determine an analog precoder based on the determined transmit vector signal;
determine a baseband signal based on the determined transmit vector signal;
determine a number of radio frequency (RF) chains based on the determined baseband signal, wherein the number of RF chains is less than a number of transmitter antennas, and wherein the number of RF chains is set to (i) one RF chain on a condition that the determined baseband signal is a complex number, or (ii) two RF chains on a condition that the determined baseband signal is a real number;
feed the baseband signal to the determined number of RF chains;
determine a beamforming signal based on the determined analog precoder and an output of the determined number of RF chains; and
transmit the determined beamforming signal using the number of transmitter antennas.

14. The device of claim 13, wherein to determine the baseband signal, the processor is configured to:
determine a maximum absolute value of the transmit vector signal; and
determine the baseband signal based on the determined maximum absolute value of the transmit vector signal.

15. The device of claim 14, wherein the number of RF chains is set to one RF chain.

16. The device of claim 14, wherein the number of RF chains is set to two RF chains.

17. A method comprising:
receiving data to be transmitted, the data comprising an input symbol vector;
determining a transmit vector signal based on a digital precoder and the input symbol vector;
determining an analog precoder based on the determined transmit vector signal;
determining a baseband signal based on the determined transmit vector signal;
determining a number of radio frequency (RF) chains based on the determined baseband signal, wherein the number of RF chains is less than a number of transmitter antennas, and wherein the number of RF chains is set to (i) one RF chain on a condition that the determined baseband signal is a complex number, or (ii) two RF chains on a condition that the determined baseband signal is a real number;
feeding the baseband signal to the determined number of RF chains;
determining a beamforming signal based on the determined analog precoder and an output of the determined number of RF chains; and
transmitting the determined beamforming signal using the number of transmitter antennas.

18. The method of claim 17, wherein determining the baseband signal comprises:
determining a maximum absolute value of the transmit vector signal; and
determining the baseband signal based on the determined maximum absolute value of the transmit vector signal.

19. The method of claim 18, wherein the number of RF chains is set to one RF chain.

20. The method of claim 18, wherein the number of RF chains is set to two RF chains.

* * * * *